US011792287B2

(12) United States Patent
Abdelwahab

(10) Patent No.: US 11,792,287 B2
(45) Date of Patent: *Oct. 17, 2023

(54) BROKER CELL FOR DISTRIBUTED MESSAGE SYSTEM

(71) Applicant: Microsoft Technology Licensing, LLC, Redmond, WA (US)

(72) Inventor: Sherif Abdelwahab, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,290

(22) Filed: Jul. 13, 2022

(65) Prior Publication Data

US 2023/0036132 A1 Feb. 2, 2023

Related U.S. Application Data

(63) Continuation of application No. 17/322,611, filed on May 17, 2021, now Pat. No. 11,477,303.

(51) Int. Cl.
*H04L 67/562* (2022.01)
*H04L 49/90* (2022.01)
(Continued)

(52) U.S. Cl.
CPC ............ *H04L 67/562* (2022.05); *G16Y 10/75* (2020.01); *H04L 5/0055* (2013.01); *H04L 49/90* (2013.01); *H04L 67/10* (2013.01)

(58) Field of Classification Search
CPC ... H04L 67/10; H04L 67/2809; H04L 5/0055; H04L 49/90; G16Y 10/75
See application file for complete search history.

(56) References Cited

U.S. PATENT DOCUMENTS 10,637,960 B2 4/2020 Srinivasan et al.
11,075,984 B1 * 7/2021 Mercier ................ H04L 43/20
(Continued)

FOREIGN PATENT DOCUMENTS

| CN | 112134293 A | 12/2020 |
| CN | 112418121 A | 2/2021 |
| KR | 102074916 B1 | 2/2020 |

OTHER PUBLICATIONS

"Kafka Apache Documentation", Retrieved from: https://web.archive.org/web/20210511171415/https://kafka.apache.org/21/documentation.html#zk, May 11, 2021, 204 Pages.
(Continued)

*Primary Examiner* — Kostas J Katsikis
(74) *Attorney, Agent, or Firm* — Holzer Patel Drennan

(57) ABSTRACT

Examples are disclosed that relate to message queuing telemetry transport (MQTT) broker cells. One example provides a computing system configured to implement an MQTT broker cell comprising instructions executable to operate two or more back-end brokers arranged in a matrix, the matrix comprising m vertical chains of back-end brokers and k back-end brokers in each vertical chain, each vertical chain comprising at least a head back-end broker and a tail back-end broker, each vertical chain configured to replicate a state update received at the head back-end broker through the vertical chain to the tail back-end broker, and operate n front-end brokers, each front-end broker configured to output a control message to a selected vertical chain of the m vertical chains and to output an application message for publication to subscribers and to one or more other MQTT broker cells. The instructions are further executable to operate r networking devices.

18 Claims, 16 Drawing Sheets

(51) Int. Cl.
  *H04L 67/10* (2022.01)
  *G16Y 10/75* (2020.01)
  *H04L 5/00* (2006.01)

(56) References Cited

U.S. PATENT DOCUMENTS

| | | | |
|---|---|---|---|
| 11,196,841 | B1 | 12/2021 | Ovadia |
| 2018/0183862 | A1* | 6/2018 | Huh ................... H04L 41/0893 |
| 2018/0248804 | A1* | 8/2018 | Nandy ................. H04L 67/56 |
| 2019/0068400 | A1 | 2/2019 | Krikorian et al. |
| 2019/0149599 | A1 | 5/2019 | Bartfai-Walcott et al. |
| 2020/0067789 | A1 | 2/2020 | Khuti et al. |
| 2021/0144176 | A1* | 5/2021 | Dong ................... H04L 67/55 |
| 2021/0211515 | A1* | 7/2021 | Rozo ................... H04L 63/0861 |

OTHER PUBLICATIONS

"International Search Report and Written Opinion Issued in PCT Application No. PCT/US22/026242", dated Jul. 28, 2022, 12 Pages.

Waehner, Kai, "Apache Kafka and MQTT (Part 1 of 5)—Overview and Comparison", Retrieved from: https://www.kai-waehner.de/blog/2021/03/15/apache-kafka-mqtt-sparkplug-iot-blog-series-part-1-of-5-overview-comparison/, Mar. 15, 2021, 13 Pages.

"Decentralized Cluster Membership, Failure Detection, and Orchestration", Retrieved from: https://web.archive.org/web/20200513073112/www.serf.io/, May 13, 2020, 4 Page.

"EdgeRouter—Border Gateway Protocol (BGP)", Retrieved from: https://web.archive.org/web/20200926215336/https:/help.ui.com/hc/en-us/articles/205222990-EdgeRouter-Border-Gateway-Protocol-BGP-, Sep. 26, 2020, 9 Pages.

"EXtensible Access Control Markup Language (XACML) Version 3.0", Retrieved from: https://docs.oasis-open.org/xacml/3.0/xacml-3.0-core-spec-os-en.pdf, Jan. 22, 2013, 154 Pages.

"The Leader in Open Source MQTT Broker for IoT", Retrieved from: https://web.archive.org/web/20210128112211/https:/www.emqx.io/, Jan. 28, 2021, 7 Pages.

Banno, et al., "Interworking Layer of Distributed MQTT Brokers", In Journal of IEICE Transactions on Information and Systems, vol. 102, Issue 12, Dec. 1, 2019, pp. 2281-2294.

Bernaschi, et al., "SockMi: A Solution for Migrating TCP/IP Connections", In Proceedings of 15th EUROMICRO International Conference on Parallel, Distributed and Network-Based Processing, Feb. 7, 2007, 5 Pages.

Chandramouli, et al., "Faster: A Concurrent Key-Value Store with In-Place Updates", In Proceedings of the International Conference on Management of Data, Jun. 10, 2018, pp. 275-290.

Eisenbud, et al., "Maglev: A Fast and Reliable Software Network Load Balancer", In Proceedings of 13th USENIX Symposium on Networked Systems Design and Implementation, Mar. 16, 2016, pp. 523-535.

Longo, et al., "MQTT-ST: A Spanning Tree Protocol for Distributed MQTT Brokers", In Repository of arXiv:1911.07622v1, Oct. 31, 2019, 6 Pages.

Obermaier, et al., "HiveMQ and Apache Kafka—Streaming IoT Data and MQTT Messages", Retrieved from: https://www.hivemq.com/blog/streaming-iot-data-and-mqtt-messages-to-apache-kafka/, Apr. 16, 2019, 15 Pages.

Ramachandran, et al., "Trinity: A Distributed Publish/Subscribe Broker with Blockchain-Based Immutability", In Repository of arXiv:1807.03110v1, Jun. 12, 2018, 8 Pages.

Renesse, et al., "Chain Replication for Supporting High Throughput and Availability", In Proceedings of 6th USENIX Symposium on Operating Systems Design and Implementation, vol. 4, Dec. 6, 2004, pp. 91-104.

Renesse, et al., "Efficient Reconciliation and Flow Control for Anti-Entropy Protocols", In Proceedings of the 2nd Workshop on Large-Scale Distributed Systems and Middleware, Sep. 15, 2008, 7 Pages.

Suresh, et al., "Stable and Consistent Membership at Scale with Rapid", In the Proceedings of the USENIX Annual Technical Conference, Jul. 11, 2018, pp. 387-399.

Terrace, et al., "Object Storage on CRAQ: High-Throughput Chain Replication for Read-Mostly Workloads", In USENIX Annual Technical Conference, Jun. 14, 2009, 16 Pages.

\* cited by examiner

BROKER CELL FOR DISTRIBUTED MESSAGE SYSTEM

CROSS REFERENCE TO RELATED APPLICATIONS

This application is a continuation of U.S. patent application Ser. No. 17/322,611, filed May 17, 2021, the entirety of which is hereby incorporated herein by reference for all purposes.

BACKGROUND

A variety of protocols for network communication have been developed for network contexts such as an internet-of-things network. One such protocol is message queuing telemetry transport (MQTT), which enables network connectivity according to a publish/subscribe paradigm in which brokers route messages to subscribing clients.

SUMMARY

Examples are disclosed that relate to message queuing telemetry transport (MQTT) brokers. One example provides a computing system configured to implement an MQTT broker cell. The system comprises instructions executable to operate two or more back-end brokers arranged in a matrix, the matrix comprising m vertical chains of back-end brokers and k back-end brokers in each vertical chain, each vertical chain comprising at least a head back-end broker and a tail back-end broker, each vertical chain configured to replicate a state update received at the head back-end broker through the vertical chain to the tail back-end broker. The instructions are further executable to operate n front-end brokers, each front-end broker configured to output a control message to a selected vertical chain of the m vertical chains and to output an application message for publication to subscribers and to one or more other MQTT broker cells. The instructions are further executable to operate r networking devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
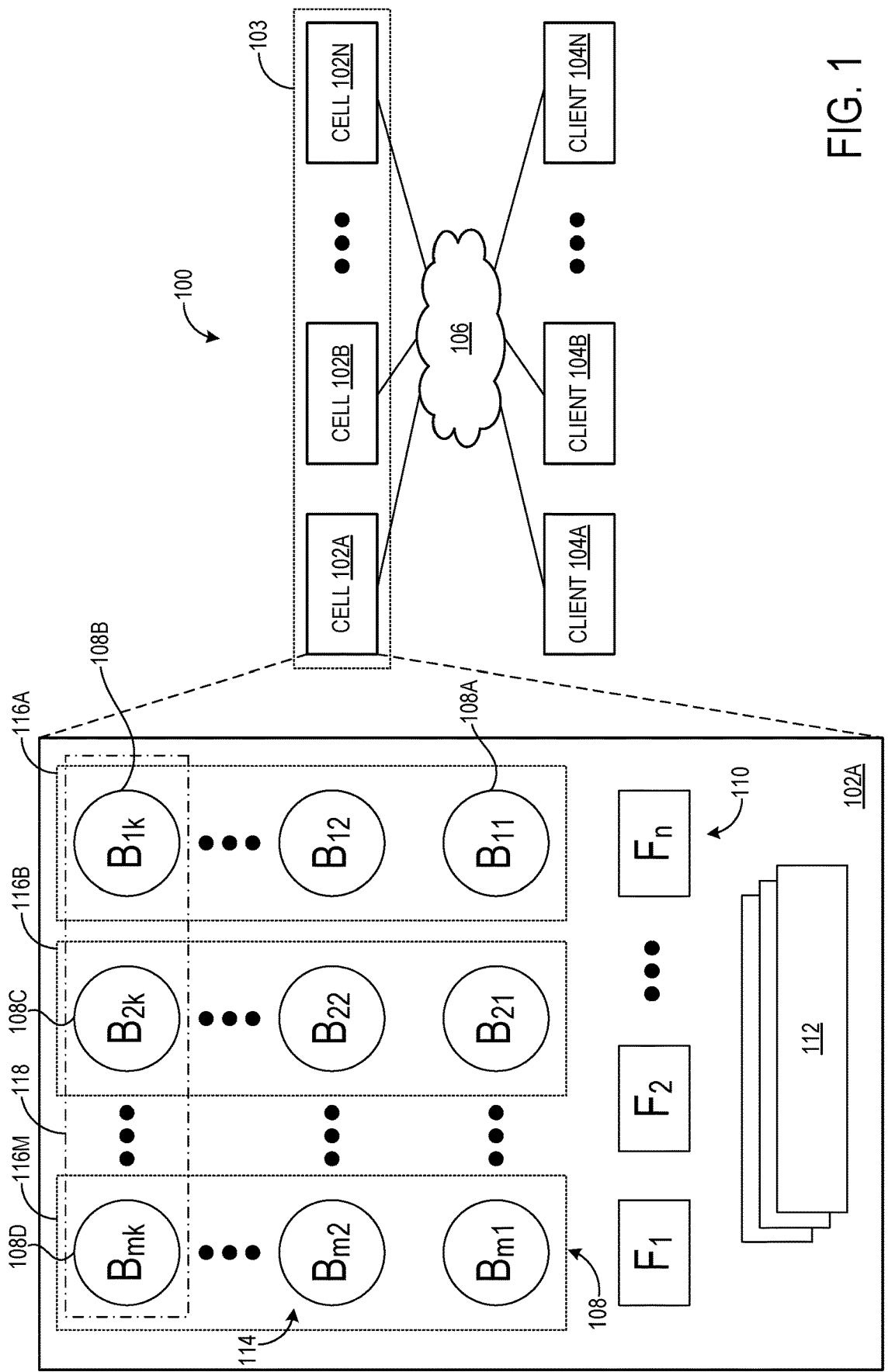
FIG. 1 depicts an example computing system comprising a plurality of MQTT broker cells.

As mentioned above, a variety of protocols for network communication have been developed for contexts such as in an internet-of-things or edge computing network. One such protocol is MQTT, which enables network connectivity according to a publish/subscribe paradigm in which brokers route messages to subscribing clients on a topical basis. Existing MQTT implementations may pose various limitations on network performance, resiliency, and scalability. For example, some MQTT implementations employ a single-node broker interconnected in a nested mode. The use of a single-node broker constrains application resiliency and scale, as the single node is insufficient to protect application messages. Moreover, in a nested topology, the root node becomes a throughput/latency bottleneck and a single point of failure for the entire system. The single-node design may further be insufficient for use at cloud-scale (e.g., to form a global MQTT gateway system) and multi-tenant deployment beyond a single virtual machine, where publisher and subscriber clients connect to different instances at scale.

Other MQTT implementations integrate a single-node MQTT broker with an APACHE KAFKA cluster (available from The Apache Software Foundation of Wilmington, Del.) as in the HIVE-KAFKA case (APACHE HIVE, available from The Apache Software Foundation of Wilmington, Del.), or integrate a datastore as a backend to persist states. While this approach may remove the overhead of developing replication techniques for the broker, the approach poses may require a complex system (e.g., KAFKA or APACHE CASSANDRA (available from The Apache Software Foundation of Wilmington, Del.)) to deploy on edge, particularly with resource-constrained deployments. Further, this approach may involve many workarounds to translate a standalone MQTT broker implementation around existing system application programming interfaces (APIs). This results in performance overhead to achieve goals such as distributed state synchronization. Moreover, the use by KAFKA of broadcast replication (i.e., primary backup) incurs an overhead—for example, it involves many cluster nodes to mitigate the same failure as other replication techniques, also incurring unnecessary messaging overhead and latency. Still further, deploying a highly available datastore at the edge incurs the same overhead as using KAFKA as a backend, and the use of a datastore involves reimplementing the MQTT broker to use the APIs of the datastore. This workaround incurs the overhead of multiple reads and writes over several roundtrips and distributed locking as the throughput and latency of the broker degrade.

Another MQTT implementation employs a broker that uses an eventually consistent model for storing and replicating subscription data, or topic-based routing only to distribute messages such as in nested-edge. Current solutions may rely on leader election across cluster members, which has a similar overhead and cost disadvantage as broadcast replication. With peer-to-peer clustering and an eventually consistent model, it may be difficult to prevent race conditions of clients connecting with same IDs, provide adequate sharding for scaling-out, and separate scaling for publishing and subscribing traffic. Moreover, cluster node failures in this approach may become complicated and error prone. Without a load-balancer, this peer-to-peer approach pushes cluster node discovery to clients and requires custom client libraries. Custom client libraries may restrict standard clients to connect to the broker, and poses additionally discovery overhead and client connection errors during cluster membership changes. Due to these limitations, this approach does not scale either the number of clients that may connect to the cluster or the number of cluster nodes, while maintaining predictable performance.

Yet another MQTT implementation utilizes a standalone primary MQTT broker that serves traffic and fails-over to a backup broker upon failure. While this approach provides a simplified setup process without requiring changes to server or client code, it is insufficient to cover the broad range of high-availability requirements, as it does not provide horizontal scaling and involves message loss during fail-over.

Accordingly, examples are disclosed that relate to an MQTT broker cell that addresses these problems and others. Briefly, the disclosed example MQTT broker cell comprises two or more (k)-back-end brokers, one or more (n)-front-end brokers, and one or more (r)-networking devices, as explained below. The back-end brokers are configured to perform various functions including topic matching, connection state management, and message lifecycle management, and maintain states regarding topic-routing, message subscriptions, and client sessions. More particularly, the back-end brokers are arranged as an m×k matrix, which includes m vertical chains of back-end brokers and k back-end brokers in each vertical chain, where m is an integer greater than zero and k is an integer greater than one. Each vertical chain is configured to replicate a state update (e.g., regarding a subscription to a topic or publication of a message) received at a head back-end broker through the vertical chain to a tail back-end broker, where subscribers to topics are identified. The matrix further comprises a horizontal chain of back-end brokers formed by m tail back-end brokers, where the horizontal chain is configured to replicate a state update regarding a wildcard topic filter, and is configured not to replicate a state update regarding a non-wildcard topic filter. The n front-end brokers output control messages for receipt by vertical chains, output via the r networking devices control messages for other MQTT broker cells, and publish application messages for receipt by subscribers. Through communication enabled by the r networking devices, the MQTT broker cell may communicatively couple with any suitable number of other MQTT broker cells in any suitable topology to form any suitable type of network in which messages are routed among different cells, including but not limited to an edge computing network, cloud computing network, and an internet-of-things (IoT) network.

The examples described herein may allow the formation of highly scalable networks in which individual broker cell capacity is scalable through the selective provision of individual back-end and front-end brokers, and overall network capacity and topology is scalable through the selective provision and connection of multiple broker cells. As such, cellular networks may be provided that are tailored to a wide variety of customers and use cases, from contexts such as edge computing in which compute and/or network resources are constrained, to large-scale computing contexts such as enterprise and cloud computing environments. Network scalability may be achieved while maintaining a predictable performance for message throughput and latency. Moreover, a scalable degree of redundancy may be provided through the replication of state updates in vertical and horizontal broker chains, enabling a resilient network with adjustable fault tolerance for individual customer use cases. The fault tolerance provided by chain replication allows broker cell functionality to persist in the event of broker failure such that message delivery may be guaranteed to a desired degree. These aspects may be achieved while reducing replication overhead compared to other architectures and without requiring third-party distributed storage or local storage dedicated to replication. Further, the disclosed techniques may provide extensibility points for distributed MQTT policies, elastic expansion, multi-protocol support, and support for varying qualities-of-service.

FIG. 1 depicts an example computing system 100 comprising a plurality of MQTT broker cells 102 and a plurality of clients 104. Broker cells 102 perform various activities relating to message routing on a topical basis. As described in more detail below, these activities include subscribing clients 104 to topics, identifying clients that subscribe to topics and routing messages relating to those topics to the subscribing clients, and routing messages to other MQTT broker cells 102. Clients 104 may thus subscribe to selected topics and thereby receive messages published to those topics. Alternatively or additionally to being subscribers, clients 104 may publish messages to selected topics. As such, clients 104 may be referred to as a "subscriber" and/or "publisher".

Broker cells 102 may route different types of messages such as application messages and control messages. As used herein, "application message" refers to client-facing data originated by and/or intended for receipt by client(s) 104. An application message may include one or more of payload data, a quality of service (QoS), one or more properties, and a topic name, for example. As a particular example, an application message may comprise sensor or telemetry data—e.g., originated from a client 104 that comprises a sensor device. As used herein, "control message" refers to messages exchanged within and/or among broker cells 102. As described below, a control message may effect state updates or other writes in a broker cell 102. Further, in some examples, control messages may pass information regarding subscriptions, publications, and/or client sessions. Control messages described herein may effect updates and deletions, which may take the form of write messages. As presented herein, write messages may start with the "write_" prefix, followed by the name of the object to write. Read messages may start with the "read_" prefix, followed by the name of the object to read. Acknowledgement control messages may start with the "ack_" prefix. Further, a control message may include one or more of the following fields: a QoS level indicating the QoS committed to a subscribing client, an ack/rec field comprising the list of clients that sent a PUBACK or PUBREC for this message, and a payload.

Broker cells 102 may discover one another via a gossip-based communication protocol in which broker cells advertise to one another. Further, two or more broker cells 102 that are operatively coupled may collectively form a distributed MQTT broker 103 that serves one or more clients 104.

Clients 104 communicatively couple with broker cells 102 to receive and/or publish messages via one or more networks, which are schematically indicated at 106. Network(s) 106 may include a local network local to one or more clients 104, an edge network, a cloud network, an enterprise network, and/or any other suitable type of network. Moreover, in some examples, network(s) 106 may be formed at least in part by one or more clients 104 and/or one or more broker cells 102.

To illustrate the configuration and function of broker cells 102, FIG. 1 schematically depicts an example implementation of broker cell 102A. As shown therein, broker cell 102A comprises two or more back-end brokers 108, one or more front-end brokers 110, and two or more networking devices 112. Each broker may be alternatively referred to herein as a "node". Back-end brokers 108 form a logical back-end layer in broker cell 102A that implements functions including topic matching, connection state management, and message lifecycle management. Front-end brokers 110 form a logical front-end layer that implements functions including communicating with clients 104, and networking devices 112 form a physical layer that routes messages to clients and other broker cells 102.

In broker cell 102A, and other example broker cells disclosed herein, back-end brokers 108 are arranged in an m×k matrix 114, where m is an integer greater than zero, and k is an integer greater than one. Matrix 114 comprises m vertical chains 116 of back-end brokers 108, including a vertical chain 116A having k back-end brokers (B11 through B1k). Vertical chain 116A includes at least a head back-end broker 108A forming the head of the vertical chain and a tail back-end broker 108B forming the tail of the vertical chain. As described in further detail below, vertical chain 116A is configured to receive a state update—e.g., regarding a client subscription or message publication—at head back-end broker 108A and replicate the state update through the vertical chain to tail back-end broker 108B. In such examples, writes occur at head back-end broker 108A and reads occur at tail back-end broker 108B. As such, the k back-end brokers 108 of vertical chain 116A provide k replicas of the broker state encoded at head back-end broker 108A. This mechanism of chain replication allows broker cell 102 to maintain broker state and client sessions, and protect message delivery, in the event of back-end broker 108 failure.

With respect to the broker configuration depicted in FIG. 1, broker cell 102A tolerates n−1 failures of front-end brokers 110, k−1 failures of back-end brokers 108, and r−1 failure of networking devices 112. While broker cell 102 remains operational (i.e., while it has a minimum number of operational brokers), the cell delivers messages to subscribers and other cells in the presence of intermittent disconnects (omission failures) outside the cell's boundary. Further, the flexibility in configuring broker cell 102A afforded by selecting the values of m, n, and k enables customization of the capacity, fault tolerance, and resource consumption of the broker cell, in a manner that adapts to a wide variety of customer use cases. For example, a first broker cell may be configured with values of k=2, m=1, and n=1, whereas a second broker cell may be configured with values of n=5, k=3, and m=3. In this example, the second broker cell tolerates the failure of up to four front-end brokers 110 and two back-end brokers 108, and provides up to five times the message throughput of the first broker cell. Generally, the broker cells described herein provide a rated MQTT message throughput according to the value of m.

The use of chain replication at vertical chains 116 may provide various advantages compared to other schemes such as primary-backup, stake-replication, and broker-replication. For example, relative to primary-backup and broker-replication schemes, chain replication may provide lower message overhead (e.g., k+1 compared to 2k), increased failure tolerance (e.g., k−1 failure tolerance compared to (k−1)/2), lower message latency (e.g., one message may be queued per node compared to k messages to place in a queue and broadcast), and increased throughput for read-mostly messages, which may be involved in topic matching and policy decisions. Further, chain replication may be implementable without a master node that is responsible for reconfiguration and health-checks, by employing a stable membership and health check protocol described below.

In some examples, head back-end broker 108A and tail back-end broker 108B may perform different functions. In such examples, tail back-end broker 108B may perform topic matching to determine the subscriber(s) that subscribe to the topic(s) of a message, where a list of the subscriber(s) may be returned to a front-end node 110. Further, tail back-end broker 108B may be configured as policy decision and policy information points. Conversely, head back-end broker 108A may be configured as a policy enforcement point and selectively allow and block clients to subscribe and/or publish messages to selected topics.

Broker cell 102 further comprises a horizontal chain 118 formed by the tail back-end brokers of each of them vertical chains 116 in the broker cell. Thus, in the depicted example, horizontal chain 118 comprises tail back-end broker 108B ($B_{1k}$) of vertical chain 116A, a tail back-end broker 108C ($B_{2k}$) of an adjacent vertical chain 116B, a tail back-end broker 108D ($B_{mk}$) of an mth vertical chain 116M, and any intervening back-end brokers that may be present depending on the value of m. Tail back-end broker 108B, which forms the tail of vertical chain 116A, also forms the head of horizontal chain 118, while tail back-end broker 108D, which forms the tail of vertical chain 116M, also forms the tail of the horizontal chain. In this example, horizontal chain 118 is configured to replicate state updates regarding a wildcard topic filter, and not to replicate state updates that do not regard a wildcard topic filter. In such examples, each of vertical chain 116 may be configured to replicate state updates regarding non-wildcard topic filters, and not to replicate state updates regarding wildcard topic filters. Further, in some examples, horizontal chain 118 may employ a variant of chain replication with apportioned queries (CRAC), where writes occur at the head of the horizontal chain (i.e., at back-end broker 108B) and reads occur at any back-end broker in the horizontal chain.

As mentioned above, front-end brokers 110 are configured to perform functions relating to communicating with clients 104. In some examples, front-end brokers 110 may maintain a state regarding client connections, but otherwise may be stateless brokers. As such, the broker arrangement of broker cell 102A may separate stateful components (back-end brokers 108, which maintain various states described below) from stateless components (front-end brokers 110, which do not maintain states other than a state regarding client connections). Further, front-end brokers 110 may expose MQTT-related protocols disclosed herein while being extensible to support other protocols including but not limited to constrained application protocol (CoAP).

Networking devices 112 are configured to receive and transmit data from/to various sources/destinations, such as front-end brokers 110, clients 104, and other broker cells 102. In some examples, clients 104 may connect to broker cell 102A via networking devices 112 using a single network address (e.g., internet protocol address). In some such examples, each front-end broker 110 may be assigned a respective network address—for example as a result of each front-end broker being implemented by a respective computing device—yet communication with broker cell 102A may be carried out using the single network address. In these examples, each front-end broker 110, while being assigned a respective network address, may advertise the single network address of broker cell 102A to networking devices 112. Further, in some examples, networking devices 112 may perform load balancing of connections to front-end brokers 110 (e.g., based on equal-cost multi-path routing (ECMP), or border gateway protocol (BPG)). Networking devices 112 may assume any suitable form, including but not limited to that of an edge router or a network load balance (e.g., in cloud deployment scenarios).

Broker cell 102A may be implemented in any suitable manner. In some examples, broker cell 102A may be implemented by n computing devices and r networking devices 112, with some of the n computing devices implementing a respective front-end broker 110 and the other of the n computing devices implementing a respective back-end broker 114. The computing devices may be communicatively coupled via networking devices 112. Such an implementation provides redundancy and fault tolerance in the event of failure of a front-end broker 110, as the functionality provided by a failed front-end broker implemented at one computing device may be resumed by another front-end broker implemented at another computing device. Any suitable type of computing device may be used to implement aspects of broker cell 102A. As one example, a low-cost computing device such as the RASPBERRY PI (available from Raspberry Pi Foundation of Cambridge, UK). Example computing and networking devices that may be used to implement broker cell 102A are described below with reference to FIG. 12.

As noted above, each vertical chain 116 is configured to replicate a state update received at a head back-end broker 108 through the vertical chain to a tail back-end broker. To this end, each back-end broker 108 may maintain one or more data structures, including but not limited to a topic table comprising information regarding one or more topics being published. The topic table may take topics as a key, and may maintain a map of topics associated with a queue of messages published to those topics. Further, the topic table may allow automatic discarding of messages within a back-end 108 broker once all subscribing clients send a PUBACK or PUBREC.

The data structure(s) may further include a session table comprising information regarding respective sessions established by one or more clients 104 and one or more topics to which the one or more clients subscribe, and a topic filter table comprising information regarding one or more topic filters associated with one or more front-end brokers 100 having one or more clients subscribing to the one or more topic filters. The topic filter table may maintain a map of wildcard and non-wildcard topic filters associated with a list of front-end brokers 110 that have subscribing clients with those topic filters. Further, each entry in the list of front-end brokers 110 may maintain a ref count of the number of clients subscribing to the topic at that broker.

The data structure(s) may further include a topic routing table comprising information regarding one or more topic filters associated with a broker cell 102 logically adjacent to broker cell 102A, and a policies table comprising information regarding authorization policies that determine which nodes are permitted to connect to a back-end broker as a front-end, and which nodes are permitted to assume a back-end functionality. The policies table also authorize clients subscription and publication to topics. The tables may be implemented as hash tables or in-memory key-value stores, for example. The replication of a state update through a vertical chain 116 thus may include writing to one or more of the data structures maintained at each back-end broker 108. Examples regarding the configuration and contents of these data structures are described in further detail below.

Figure 2A:
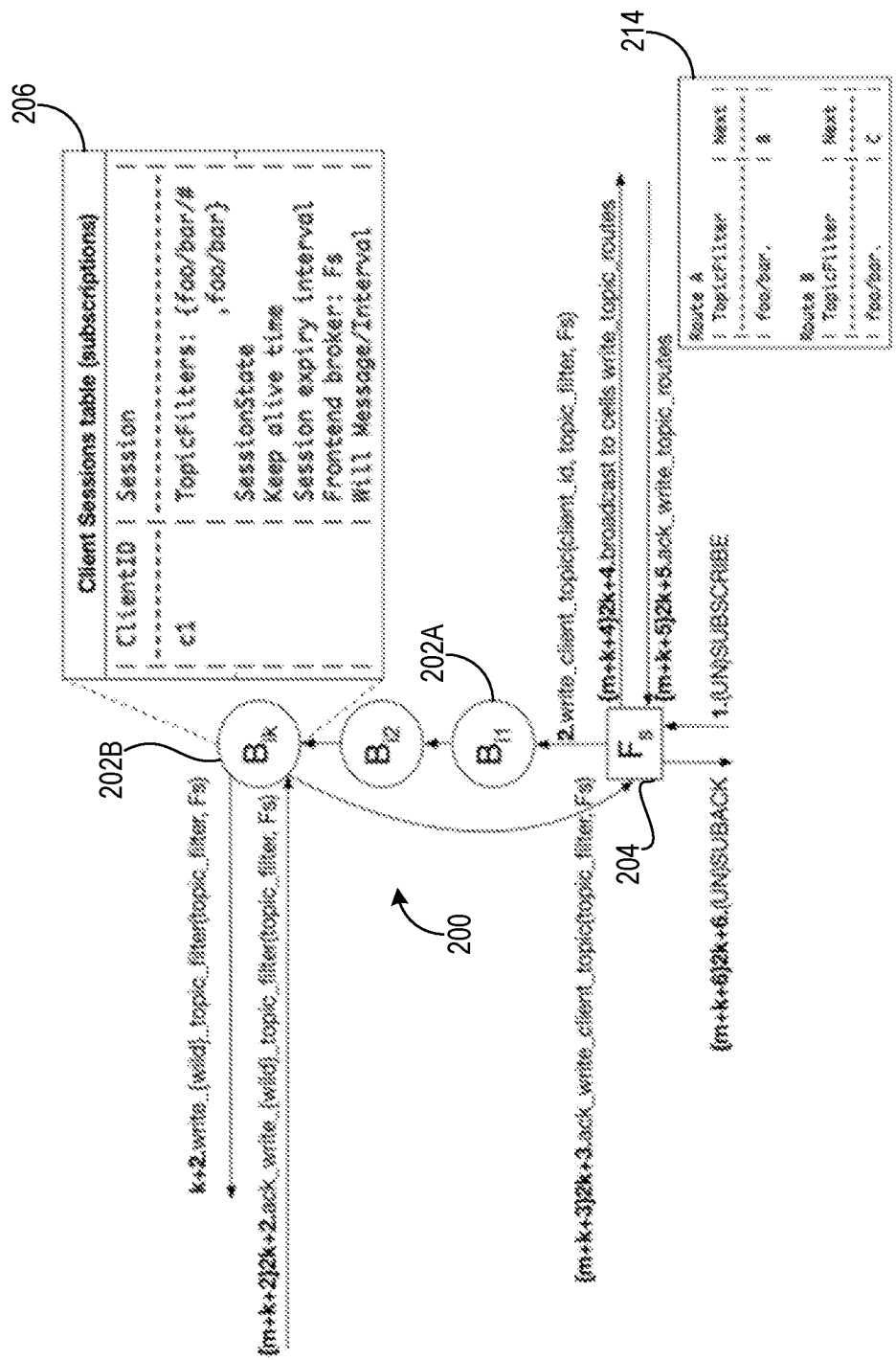
FIGS. 2A-2C depict flow diagrams illustrating example processing of a client request regarding a subscription.

FIG. 2A depicts a flow diagram illustrating processing of a client request regarding a subscription at a vertical chain 200 of back-end brokers 202. The process illustrated by this example may be implemented to subscribe a client 104 to one or more topics to which application messages are published. In this example process, a client request to subscribe (SUBSCRIBE) to one or more topics is received at a front-end broker 204 ($F_s$). Front-end broker 204 hashes one of an identifier of the client associated with the request or a topic filter, and based on the resultant hash selects vertical chain 200 (among other vertical chains) to update a client session associated with the client. In some examples, vertical chain 200 may be selected based on consistent hashing determined based on the client identifier. As one example, Maglev hashing may be used, which may provide load balancing properties to consistent hashing. In other examples, any other suitable hashing method may be used. Generally, hashing keys that may be used in broker transactions include a client identifier, a publish topic, and a topic filter.

Upon selecting vertical chain 200, front-end broker 204 sends a control message (write_client_topic) to a head back-end broker 202A ($B_{i1}$). The control message includes the client identifier, a topic filter (foo/bar) associated with the client request, and an identifier of front-end broker 204. Based on the control message, head back-end broker 202A updates the topic filters of the session entry in a session table maintained by the head back-end broker, and causes the control message (write_client_topic) to be replicated to the next back-end broker ($B_{i2}$) and through vertical chain 200 to a tail back-end broker 202B ($B_{ik}$). Upon receiving the control message, tail back-end broker 202B updates the topic filters of the session entry in a session table 206 maintained by the tail back-end broker. Via this replication mechanism, back-end brokers 202 are notified that there is a front-end broker 204 ($F_s$) that has a subscriber to foo/bar.

Figure 2B:
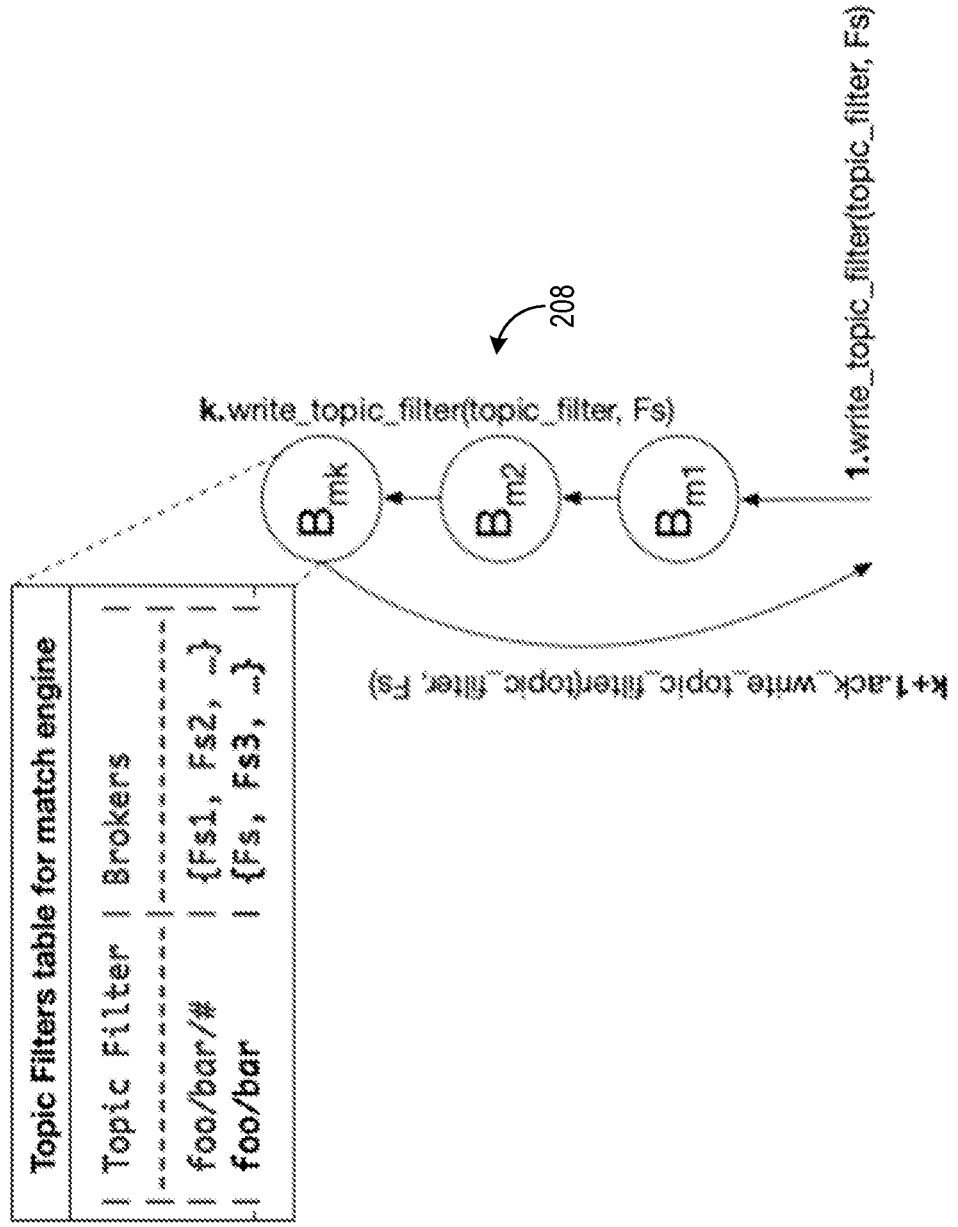

Tail back-end broker 202B then initiates a topic filter update procedure that varies depending on whether the client request regards a non-wildcard topic filter or a wildcard topic filter. FIG. 2B illustrates one example in which the request regards a non-wildcard topic filter, in which tail back-end broker 202B hashes the topic filter and selects another vertical chain 208 at which to update the topic filter tables maintained by the back-end brokers in the other vertical chain using consistent hashing. As shown therein, a control message (write_topic_filter) including an identifier of the topic filter and front-end broker 204 is used to replicate a corresponding state update through vertical chain 208. The tail back-end broker of vertical chain 208 then sends an acknowledgement (ack_write_topic_filter), indicating that the state update was replicated through the vertical chain, to tail back-end broker 202B ($B_{ik}$) of vertical chain 200. Tail back-end broker 202B then sends an acknowledgement (ack_write_client_topic) to front-end node 204 indicating that the subscription is stored. Front-end node 204 may then output an acknowledgment (SUBACK) for receipt by the client.

Figure 2C:
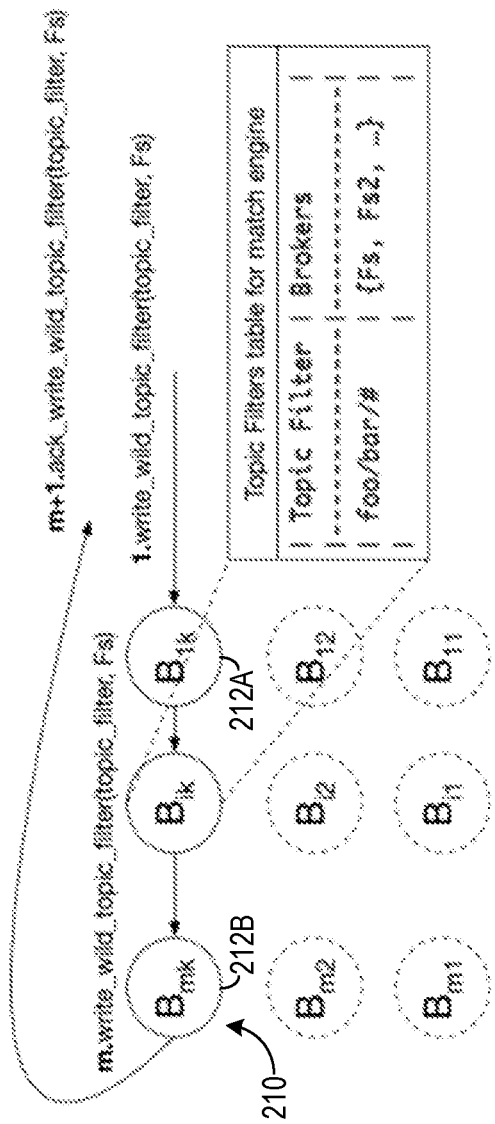

FIG. 2C illustrates an example in which the client request regards a wildcard topic filter. In this case, tail back-end broker 202B replicates a state update through a horizontal chain 210 of tail back-end brokers by sending a control message (write_wild_topic_filter) to a head back-end broker 212A of the horizontal chain. Upon replicating the state update at a tail back-end broker 212B of horizontal chain 210, the tail back-end broker sends an acknowledgement (ack_write_wild_topic_filter) to tail back-end broker 202B of vertical chain 200. Tail back-end broker 202B then sends an acknowledgement (ack_write_client_topic) to front-end broker 204 indicating that the subscription is stored. Front-end node 204 may then output an acknowledgment (SUBACK) for receipt by the client.

In some examples, a broker cell implementing vertical chains 200 and 208, and horizontal chain 210, may be communicatively coupled to one or more other broker cells. Upon receiving a client request to subscribe, and in addition to performing corresponding chain replication in the broker cell, the request may be broadcast to the other broker cell(s). To this end, and upon receiving either an ack_write_topic_filter acknowledgment or an ack_write_wild_topic_filter, front-end broker 204 may evaluate a topic routing overlay across the other broker cell(s), e.g., using a minimum spanning tree. Then, as shown in FIG. 2A, front-end broker 204 may broadcast a control message (write_topic_routes) to the other broker cell(s). Upon all of the other broker cell(s) returning an acknowledgement (ack_write_topic_route) to front-end broker 204, the front-end broker may return an acknowledgement (SUBACK) to the client. In determining the other broker cell(s) to broadcast to, front-end broker 204 may use a topic routing table 214 that maintains a map of wildcard and non-wildcard topic filters associated with a network address of the next broker cell (e.g., logically next in a network pathway) to route a publish message that matches a topic filter.

While the process disclosed above with reference to FIGS. 2A-2C is described in relation to a subscription request, the process further applies to a request to unsubscribe to one or more topics. Where the request regards unsubscribing, the write_client_topic and write_{wild}_topic_filter control messages delete a topic filter entry from session table 206 and a topic filter table entry described below, respectively. Further, the write_topic_route control message updates the routing table for all other broker cells that the broker cell communicates with.

As mentioned above and as shown in FIG. 2A, tail back-end broker 202B of vertical chain 200 is configured to update session table 206 maintained by the tail back-end broker. Session table 206 may maintain a map of client identifiers associated with a session state. As shown in FIG. 2A, a session entry may include a topic filters field comprising a list of topic filters the client subscribed to, a session state field indicating the current state of the client session (Undefined, Connected, WILL_WAIT, or EXPIRY_WAIT), a keep alive time indicating the time remaining to receive at least one control message from the client, a session expiry interval indicating the time remaining to expire the session, an identification of the front-end broker 204 currently connected to the client, and a will message/interval field indicating the WILL message and WILL interval to send the WILL message.

In the examples depicted in FIGS. 2A-2C, wildcard topic filters are provided at all vertical chains, as the back-end brokers are unaware of the published topic before the topic filters are updated. Wildcard topic filters are written through horizontal chains instead of vertical chains to minimize the overhead of sending wildcard topic filters to all chains. In this arrangement, the throughput of topic matching may be substantially similar for non-wildcard and wildcard topic filters.

Figure 3A:
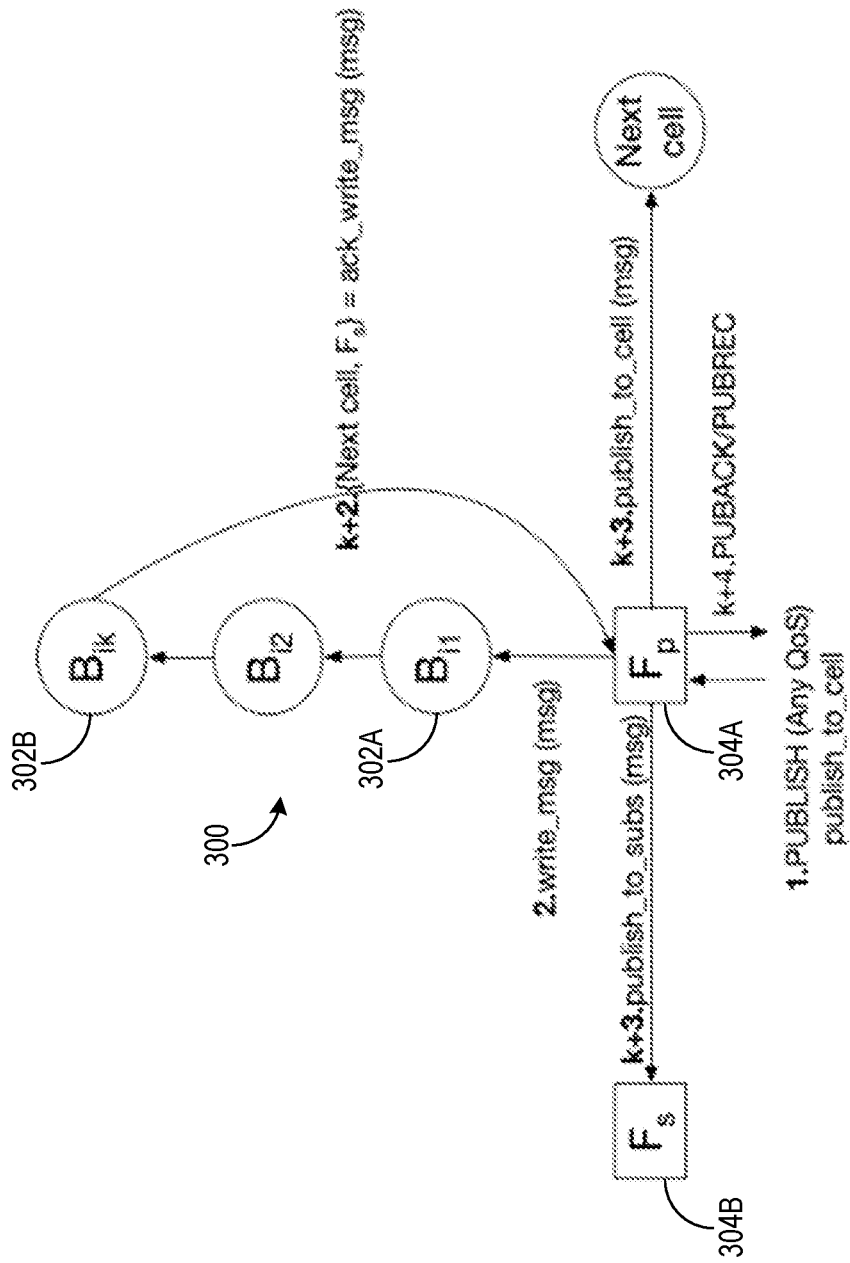
FIGS. 3A-3B depict a flow diagram illustrating example processing of a publish message.

FIG. 3A depicts a flow diagram illustrating processing of a publish message at a vertical chain 300 of back-end brokers 302. In this example, a front-end broker 304A ($F_p$) receives a publish message (PUBLISH) from a client connected to the broker cell implementing the front-end broker, or a publish message (publish_to_cell) from another broker cell. Front-end broker 304A hashes the topic of the message, selects vertical chain 300 (among other vertical chains in the broker cell) using consistent hashing for example, and sends a control message (write_msg), including an application message (msg) published by the publishing client, to a head back-end broker 302A ($B_{i1}$). Head back-end broker 302A then stores the application message in its topic table and causes the write_msg control message to be forwarded through vertical chain 300. At a tail back-end broker 302B ($B_{ik}$), the topic of the message is matched all topic filters including non-wildcard and wildcard topic filters, and a list is determined of front-end brokers that have connected clients subscribing to the message. Such front-end brokers may be referred to as "subscribing brokers". Further, tail back-end broker 302B runs a matching algorithm against its topic routing table to determine the next broker cell to forward the message to. Tail back-end broker 302B then sends an acknowledgement (ack_write_msg) to front-end broker 304A with the list of front-end brokers having subscribing clients and an identification of the next broker cell. At this point, message ownership is transferred to the broker cell.

Upon receiving the acknowledgment (ack_write_msg), front-end broker 304A sends a publish_to_subs control message to all subscribing brokers to start publishing the application message to subscribers. Front-end broker 304A also sends a publish_to_cell control message—including the application message—to the next cell to route the application message to clients that subscribe to other broker cells. In some examples, both publish_to_subs and publish_to_cell may be asynchronous, and front-end broker 304A may not block a subscribing broker or next cell to complete sending the application message to subscribers. Where publishers use QoS1 or QoS2, front-end broker 304A may complete the message publication process by sending a PUBACK acknowledgement or PUBREC acknowledgement to the client. Where publishers use QoS0, message replication may be performed, as, if a subscriber requests QoS1 or QoS2 for message delivery from a front-end broker, a broker cell performs message replication to ensure reliable delivery in case of failure.

With reference to the process illustrated in FIG. 3A, a design goal for handling PUBLISH messages is to guarantee message delivery to subscribing clients after a publishing client transfers ownership to a broker cell. Message delivery may either be intra-cell (i.e., within a broker cell) for subscribing clients connected to the broker cell, or inter-cell (i.e., among different broker cells) for subscribing clients connected to a different cell. To this end, front-end broker 304A handles PUBLISH and publish_to_cell messages with the same flow.

Figure 3B:
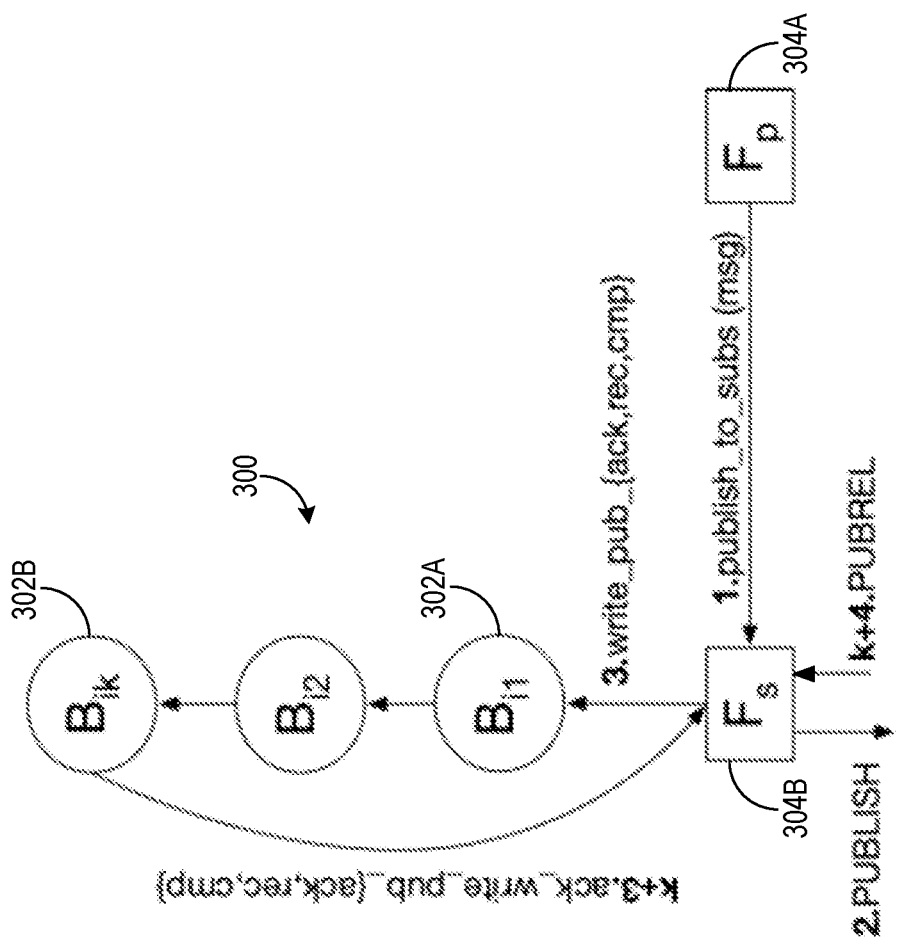

FIG. 3B illustrates the reception of the publish_to_subs control message, sent from front-end broker 304A, at another front-end broker 304B ($F_s$). In some examples, front-end brokers 304A and 304B may be implemented at a common broker cell. In the depicted example, front-end broker 304B has one or more clients that are subscribers to the topic of the application message included in the publish_to_subs control message. Front-end broker 304B may thus be considered a subscriber of front-end broker 304A, which may be considered a publisher. Upon receiving the publish_to_subs control message, which includes the application message (msg), front-end broker 304B publishes the application message to the subscribers of the topic of the application message. Front-end broker 304B then outputs a control message (write_pub) that effects the replication of a state update regarding the publication through vertical chain 300, which leads to discarding an outstanding publication to the subscribers in the vertical chain and tail back-end broker 302B sending to the front-end broker an acknowledgement of the control message. For QoS1 and QoS2 messages, front-end broker 304B may update message flags in the topic filter upon receiving PUBACK, PUBREC, or PUBCMP messages from a client. Further, the application message may be deleted upon receiving an acknowledgement from the client. For application messages accompanied by a retain flag, such messages may not be deleted after receiving an acknowledgement or a CMP (MQTT PUBCMP message) from the client. For subscribers in a disconnected session state, an application message may be identified as pending publishing.

Figure 4A:
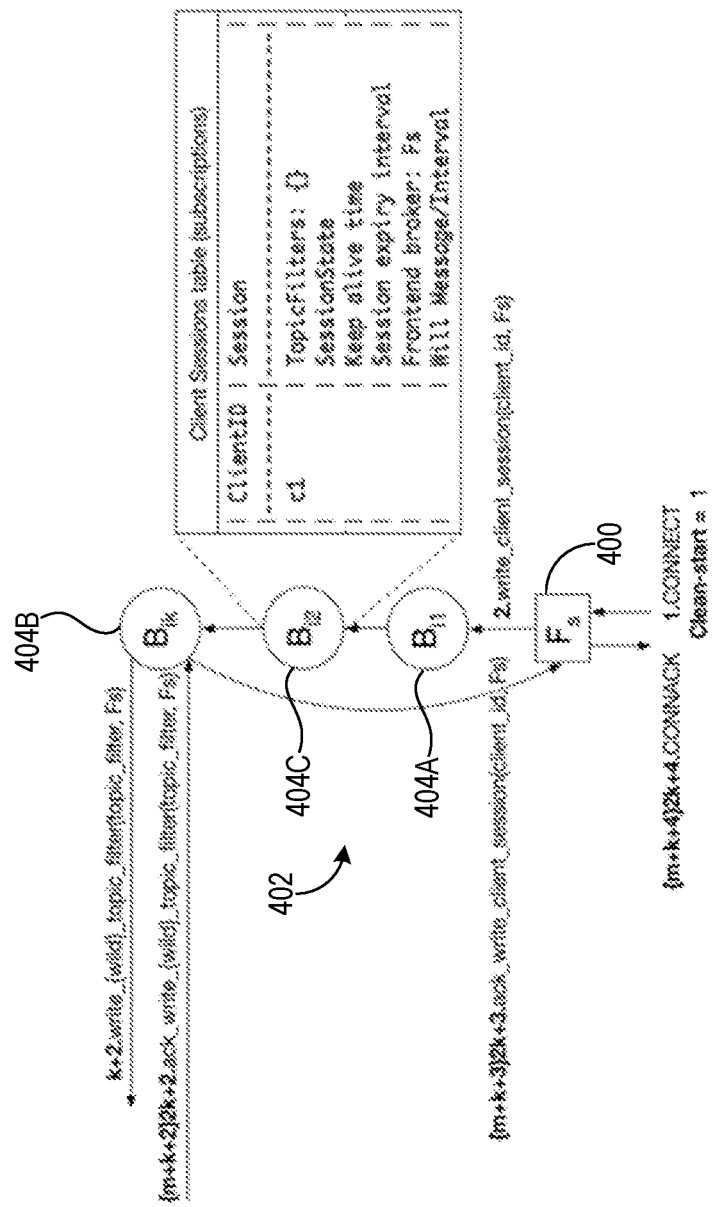
FIG. 4A depicts a flow diagram illustrating an example establishment of a new client connection.

FIG. 4A depicts a flow diagram illustrating an establishment of a new client connection at a front-end broker 400 ($F_s$) and a vertical chain 402 of back-end brokers 404. In this example, front-end broker 400 receives a request (CONNECT) from a client to connect to the front-end broker. The request is accompanied by a flag indicating that clean start is enabled. Front-end broker 400 hashes an identifier of the client and selects vertical chain 402 (among other vertical chains) to update the client session. As such, front-end broker 400 sends a control message (write_client_session) to a head back-end broker 404A ($B_{i1}$). The control message may indicate that the client is connected to front-end broker 400, where such information may be replicated through vertical chain 402. Head back-end broker 404A, and all other back-end brokers other than a tail back-end broker 404B ($B_{ik}$)—i.e., middle back-end broker 404C ($B_{i2}$)—replace the existing client session entry in their client session tables with an updated entry. Further, all subscriptions of the client may be deleted. As an example, FIG. 4A depicts a client session table 406 maintained by middle back-end broker 404C. Further, tail back-end broker 404B updates the topic filter by sending either a write_topic_filter control message or a write_wild_topic_filter control message to a horizontal chain of back-end brokers, as described below with reference to FIG. 4B. Tail back-end broker 404B then sends and acknowledgement (ack_write_client_session) to front-end broker 400, which sends an acknowledgement (CONNACK) to the client.

Figure 4B:
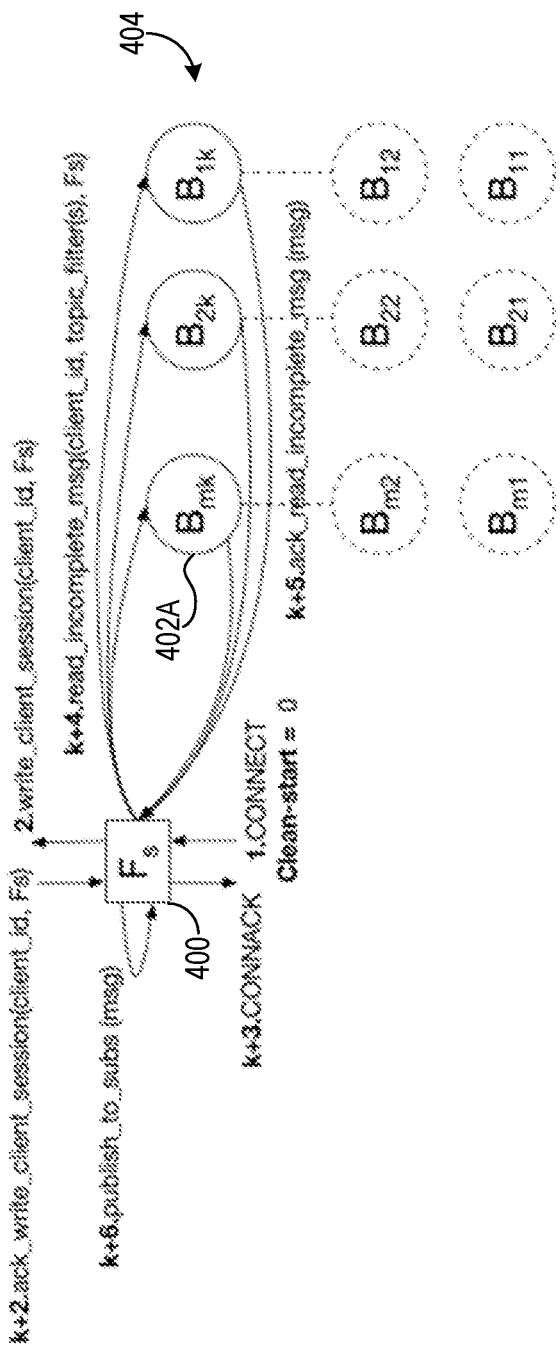
FIG. 4B depicts a flow diagram illustrating an example resumption of a client connection.

FIG. 4B depicts a flow diagram illustrating resumption of a client connection at front-end broker 400 where clean start is disabled. A client connection may be lost due to network interruption, for example. In this scenario, front-end broker 400 resumes the client session and sends any incomplete messages to the client. Front-end broker 400 receives a request (CONNECT) from a client to connect to the front-end broker with a flag indicating that clean start is disabled. Front-end broker 400 then hashes an identifier of the client and selects a vertical chain (e.g., vertical chain 402) to update the client session. Front-end broker 400 sends a control message (write_client_session) to the head back-end broker of the vertical chain. Each back-end broker in this vertical chain does not discard the session but updates the session state field and expiry/keep alive interval times in its client session table. Front-end broker 400 then sends a control message (read_incomplete_msg) to all tail back-end brokers 402 in a horizontal chain 404 provided by the broker cell implementing the front-end broker. This control message includes a list of the client's topic filters. Upon receiving the read_incomplete_msg control message, each tail back-end broker 402 matches all the topics in its topic table and searches for messages where PUBACK or PUBREC has not been received from the client. Each tail back-end broker 402 compiles a list of the incomplete messages and sends the list to front-end broker 400 in an acknowledgement (ack_read_incomplete_msg). Upon receiving the ack_read_incomplete_msg acknowledgement from all tail back-end brokers 402, front-end broker 400 sends an acknowledgement (CONNACK) to the client and executes the process performed in receiving publish_to_subs (described above with reference to FIGS. 3A-3B) to send all incomplete messages to the client.

Figure 5:
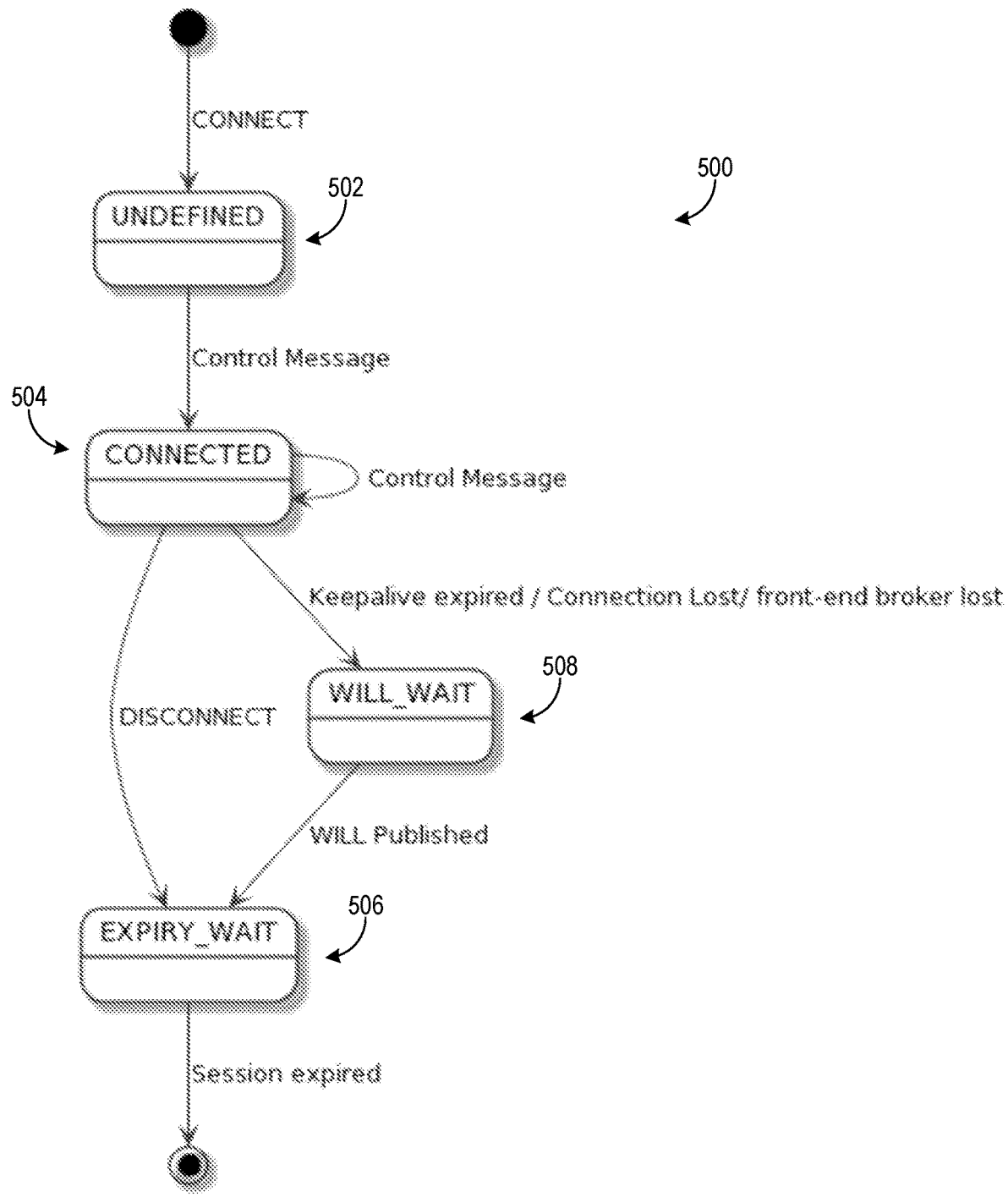
FIG. 5 shows a state diagram illustrating an example session connection state.

In some examples, a broker cell may track the session state for clients and replicate the session to compensate for front-end broker failure. FIG. 5 shows a state diagram 500 illustrating a session connection state. A session is in an UNDEFINED state 502 when a front-end broker receives a CONNECT message from a client. Upon receiving a control message (e.g., ping, subscribe, or publish control messages), the session transitions into a CONNECTED state 504 and remains in that state as long as the front-end broker receives control messages within the keep-alive time. The session transitions to an EXPIRY_WAIT state 506 upon receiving DISCONNECT. Alternatively, the session transitions to a WILL_WAIT 508 state if one or more of the keep-alive time has expired (e.g., after not receiving control messages within the keep-alive time), the client connection is lost, or the front-end broker failed. In the WILL_WAIT state 508, the front-end broker may assume that the client has disconnected, and may start an expiring timer. Upon expiration of the expiring timer, the client may be considered to be in an offline state, upon which all sessions (and its associated outstanding messages) corresponding to the client may be removed. Further, as in some examples front-end brokers send all control messages (e.g., PUBLISH, SUBSCRIBE, KEEPALIVE) to the back-end brokers, the back-end brokers may manage the session connection states and timer expiry. If the client does not use keep-alive, the front-end broker may keep the session state in-sync. One mechanism to accomplish such synchronization is through health checks, which is described below.

In some examples, handling a session's expiry in the EXPIRY_WAIT state may be similar to handling the session's discard upon receiving DISCONNECT or CONNECT with a clean start. However, the trigger to the session discard is not receiving a write_client_session message but is self-triggered with timer expiry. In both cases, a tail broker initiates write_topic_filter and write_wild_topic_filter messages to delete the client's topic subscriptions. The back-end brokers also manage the WILL_WAIT state, and transition the connection state to the EXPIRY_WAIT state upon satisfaction of the conditions described above. Further, the tail broker initiates sending of the WILL messages to subscribing clients by sending a publish_to_subs message to all subscribing brokers to start publishing the WILL message to subscribing clients, and sending a publish_to_cell message to the next broker cell to route the message to subscribing clients of other broker cells.

Figure 6:
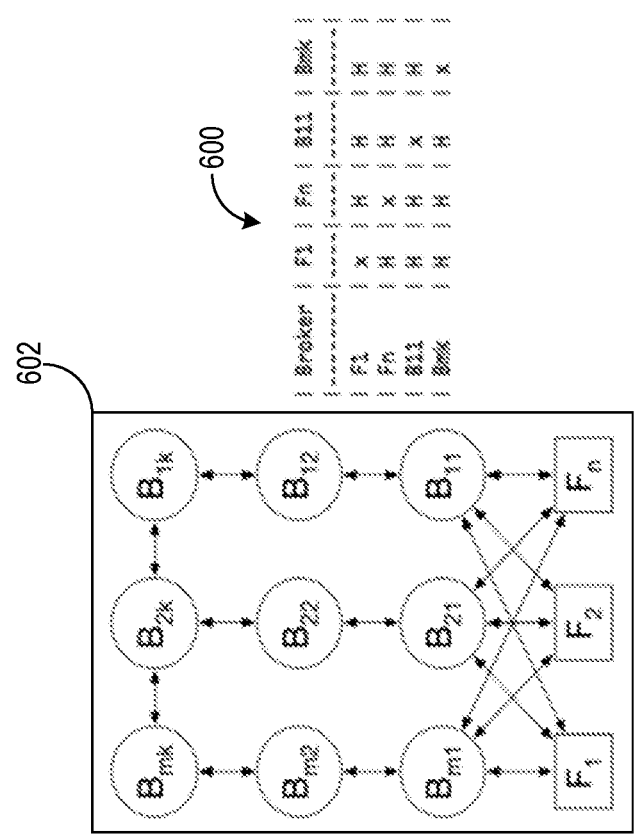
FIG. 6 shows an example data structure in the form of a broker health table.

Information regarding broker and broker cell health may be exchanged among brokers in a broker cell, and among different broker cells, to detect and manage broker and/or broker cell failure. To this end, each broker in a broker cell may maintain a data structure indicating the health of each of the other brokers in the broker cell. As one example, FIG. 6 shows an example data structure in the form of a broker health table 600 that may be maintained by each broker in a broker cell 602. For the sake of brevity, table 600 is shown in FIG. 6 as omitting indications of health for some of the brokers in broker cell 602, but otherwise may indicate the health of each broker in the broker cell. Indications of broker health, and thus updates to table 600 maintained at each broker, may be exchanged among brokers via a Rapid-based communication protocol (see, e.g. Suresh, Lalith; et al. "Stable and consistent membership at scale with rapid." 2018 *USENIX Annual Technical Conference (ATC* 18). 2018).

An example follows illustrating the exchange of health information in the event of the failure of a middle back-end broker 604A ($B_{12}$). In this example, a head back-end broker 604B ($B_{11}$) detects the failure of middle back-end broker 604A. A broker health table (e.g., table 600) stored at head back-end broker 604B may be updated to indicate this failure, which may also be propagated to the broker health tables stored at each of the other operational back-end brokers to thereby obtain a consensus regarding back-end broker health. From configuration, a back-end broker determines that the next operational back-end broker in this vertical chain is a tail back-end broker 604C ($B_{1k}$), head back-end broker 604B replicates a state update—which would otherwise be replicated to middle back-end broker 604A had it not failed—to the tail back-end broker. In other words, head back-end broker 604B and tail back-end broker 604C become connected, and middle back-end broker 604A is removed from the vertical chain. However, in some examples, middle back-end broker 604A may be recovered, in which case it may be added to the end of the vertical chain and thereby become the new tail back-end broker of the chain. Broker recovery may be implemented in any suitable manner, such as by ending and relaunching the software process implementing the failed back-end broker. In other examples in which brokers are containerized, the failed back-end broker may be recovered by spinning up a new container.

In the example depicted in FIG. 6, all brokers in broker cell 602 maintain a consistent view of broker health and membership. This may be achieved without deploying a master node or leader-election, and may ensure that broker cell 602 is stable in the presence of failure scenarios (e.g., the broker cell does not alternate a node status between healthy and unhealthy).

Figure 7:
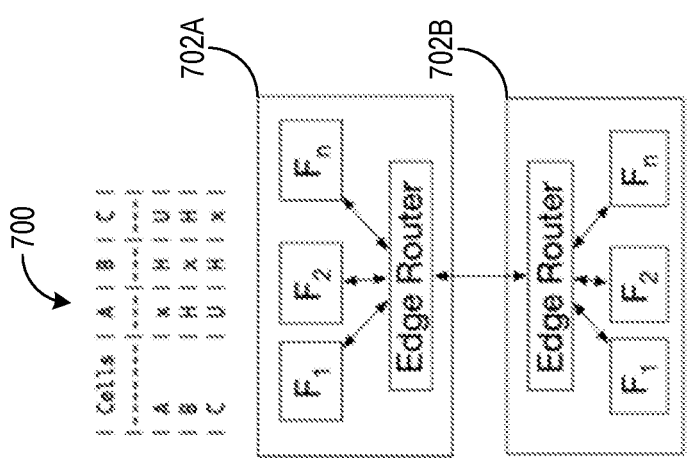
FIG. 7 illustrates an example data structure in the form of a cell health table.

As noted above, different broker cells may also exchange information regarding cell health and membership. To this end, front-end brokers of broker cells may employ a gossip-based communication protocol to exchange health/membership information. As one example, FIG. 7 illustrates a cell health table 700 that may be maintained by each front-end broker of broker cells 702A and 702B, which communicate with each other via networking devices in the form of edge routers. In this example, cell health table 700 indicates the respective health states of three broker cells including cells 702A and 702B, and also indicates the topology in which the cells are connected. Cell health table 700 may be used by a subscribing front-end broker to evaluate topic routing across broker cells, for example.

In the example described above, the exchange of information regarding cell membership may help to create a consistent view of broker cell connectivity topology. In a typical cloud deployment, cells are mostly fully connected, while in an industrial internet-of-things (IIoT), the Purdue network model restricts connectivity between the layers and hence forms a specific connectivity graph between broker cells. The tracking of stability of the topology view at each cell for inter-cell membership may be foregone, and broker cell membership may be eventually consistent. Relaxing membership consistency for inter-cells may be selected because membership or topology changes do not involve data-migration or an expensive overhead beyond recomputing topic routing tables. On the other hand, the membership discovery protocol may rapidly respond to connectivity changes where cells are connected over lossy networks or have intermediate connection availability.

Figure 8:
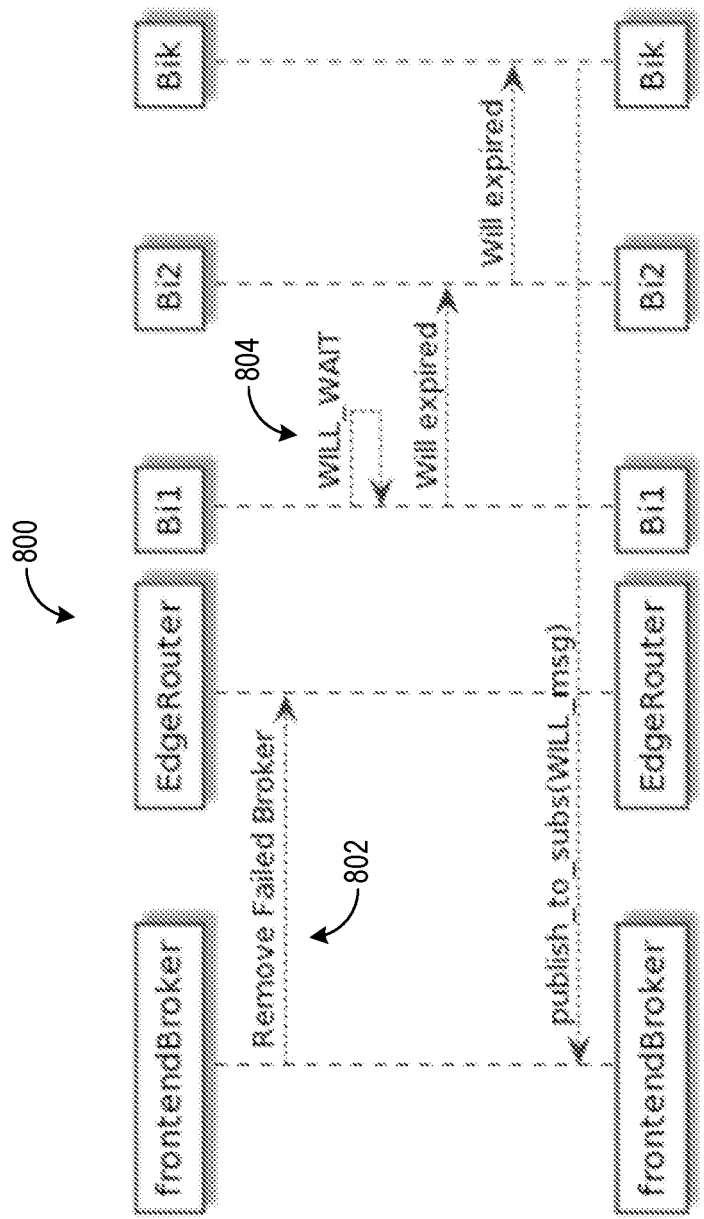
FIG. 8 depicts a flow diagram illustrating example handling of the failure of a front-end broker.

FIG. 8 depicts a flow diagram 800 illustrating handling of the failure of a front-end broker. In this example, failure of a front-end broker triggers two recovery mechanisms: (1) updating the networking devices in the broker cell—via another running front-end broker—to steer traffic away from the failed front-end broker, as indicated at 802, and (2) transitioning all client sessions connected to the failed front-end broker to a WILL_WAIT state, as indicated at 804. Configuring another front-end broker update the networking devices may avoid adding an additional management-plane node for that purpose. To prevent multiple front-end brokers attempting the update, the front-end broker with an IP address next to the failed front-end broker may automatically assume the update role.

Continuing with FIG. 8, the head back-end brokers transition the client session states to WILL_WAIT for all client sessions connected to the failed front-end broker. If a client never connects to another front-end broker, and the WILL timer expires, a head back-end broker transitions the session state to EXPIRY_WAIT, and propagates the state update through its vertical chain so that the tail back-end broker initiates a publish to the WILL message and prepares for discarding the session state after the EXPIRY timeouts. In some examples, failures of a front-end broker may entail temporary client disconnects and involve reestablishing TCP connections to another front-end broker, as load-balancing (e.g. L4 load balancing) may not support seamless migration of connections. If supported by an edge router or in cloud-deployment, a load balancer supporting transmission control protocol (TCP) connection migration may seamlessly handover the client's TCP connection to another front-end broker. In this case, transitioning to the WILL_WAIT state is not necessary.

When a head back-end broker fails, the front-end brokers in a broker cell may make the successor back-end broker the new head back-end broker. Since the Rapid algorithm ensures a consistent view of all nodes' health, the head update does not require a master node. This action may cause intermittent drops of the internal messages where the front-end brokers must retransmit the messages. The retransmission uses a timeout expiry since the front-end broker detects a connection loss to the head node and a health update indicating the head broker failure.

When a middle back-end broker fails, the predecessor and successor brokers reconfigure themselves to relink the vertical chain, as described above with reference to FIG. 6. This action is also possible without a master as the Rapid algorithm may be used to detect failure where the predecessor and successor brokers have a consistent view of the middle broker's health state. Such reconfiguration does not require the front-end broker to retransmit messages.

Figure 9:
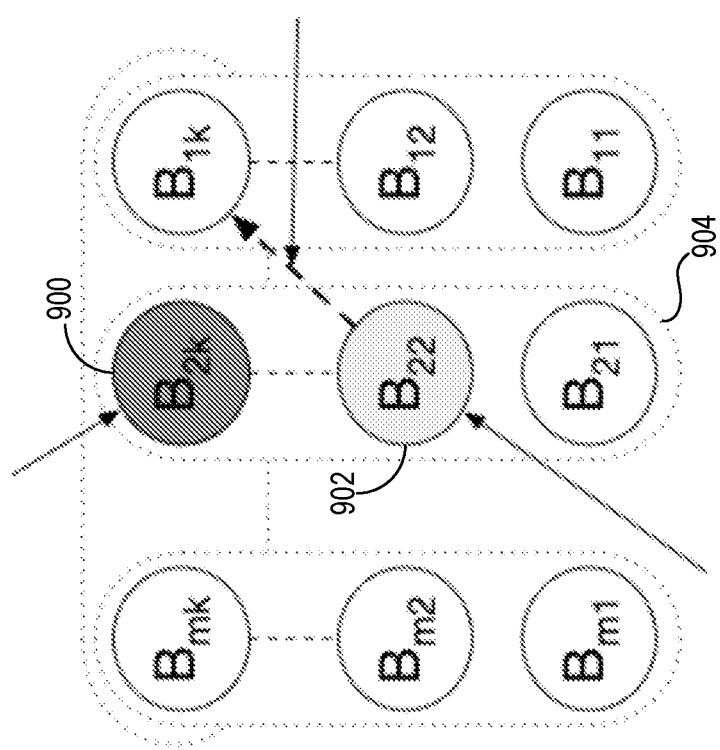
FIG. 9 illustrates an example method of handling the failure of a tail back-end broker.

The failure of a tail back-end broker involves failure of a broker that performs topic matching and failure of a broker that forms the head of a horizontal chain. FIG. 9 illustrates an example of handling the failure of a tail back-end broker 900. In this example, the predecessor of the failed tail back-end broker—a middle back-end broker 902—updates itself as the new tail back-end broker of a vertical chain 904. Back-end broker 902 then redirects topic matching requests, for non-wildcard topics, to the tail back-end brokers of other horizontal chains, and for wildcard topics, to the tail back-end brokers of other vertical chains. This redirection may be temporary until an operator adds a new tail node to maintain the chain length.

Figure 10:
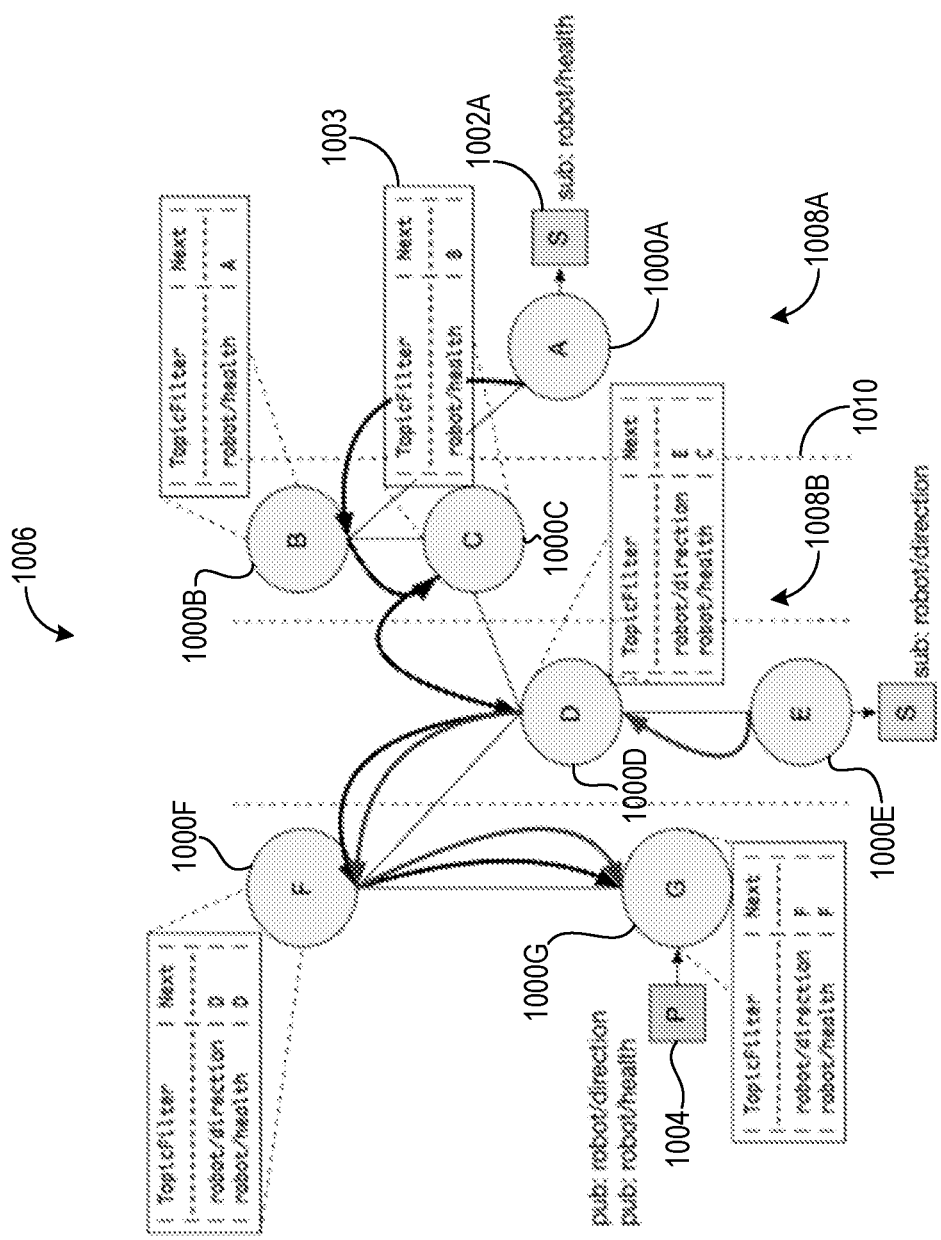
FIG. 10 illustrates an example in which a group of broker cells are connected in a nested topology.

As described above, in some examples, application messages may be published from one broker cell to subscribers connected to another broker cell. A topic routing mechanism may be used to facilitate such inter-cell communication. FIG. 10 illustrates one example in which a group of broker cells 1000 connected in a nested topology route messages from a publisher in one cell to subscribers of other cells. Here, the routing of application messages among broker cells may be achieved by implementing aspects of the purplish-receive process illustrated in FIG. 3A and the publish-send process illustrated in FIG. 3B. In particular, an application message may be routed to another broker cell via the publish_to_cell control message.

In this example, broker cell 1000A has a subscriber 1002A to the topic robot/health. Upon receiving the subscription to robot/health, broker cell 1000A propagates the subscription—via a topic routing table 1003 indicating the next broker to propagate to on a per-topic basis—to a broker cell 1000B. Via topic routing tables maintained at each broker cell 1000, the subscription is then propagated from broker cell 1000B, to broker cell 1000C, to broker cell 1000D, to broker cell 1000E, to broker cell 1000F, and finally to broker cell 1000G, in this order. A publisher 1004 connected to broker cell 1000G publishes application messages to the topic robot/health and robot/direction. With the subscription propagated to broker cell 1000G, subscriber 1002A may then receive application messages published by publisher 1004 to the robot/health topic.

According to the inter-cell routing protocol illustrated by FIG. 10, overhead may be minimized without requiring broadcasting messages to all topology cells, while providing scale. In this example, the construction of the topic route tables occurs with each subscription. Each broker cell—represented by a front-end broker—has a consistent view of the cell topology constructed by the cell's gossip protocol. When a client sends a SUBSCRIBE message to a front-end broker, the front-end broker may run a minimum spanning tree algorithm or other suitable algorithm to determine a route that spans all the cells in a topology. For more connected topologies, the algorithm shall consider metrics that ensure reliability and/or utilization of routes. The algorithm may result in a route table entry update broadcast to all other cells. This route table entry update may be the only message broadcasted to the cells. A control-topic $SYS/routing may be used to allow the broker cells to propagate such messages across the topology. Sending messages over $SYS/routing may also occur through a spanning tree that is consistently evaluated by all cells in some examples.

According to the inter-cell topic-based routing described above, it may be ensured that any subscribing client receives messages published to the subscribed topic filter even if the publishers connect to broker cells other than the subscribers' broker cells. Topic routing may assume that the topology of the broker cells is connected or frequently connected. The frequently connected condition includes that broker cells are eventually connected since a single broker cell can deliver messages to other broker cells whenever they become connected.

In the example depicted in FIG. 10, broker cells 1000 are provided in different logical layers of a computing system 1006, where the different layers are separated by firewalls. For example, broker cell 1000A is arranged in a first logical layer 1008A separated from a second logical 1008B layer by a firewall, schematically indicated at 1010, where the second logical layer includes broker cells 1000B and 1000C. Computing system 1006 may represent an implementation of a Purdue system model in which each logical layer deploys one or more interconnected broker cells 1000 within the same logical level, where in each logical layer one broker cell connects to the cells from adjacent higher and/or lower layers.

Figure 11:
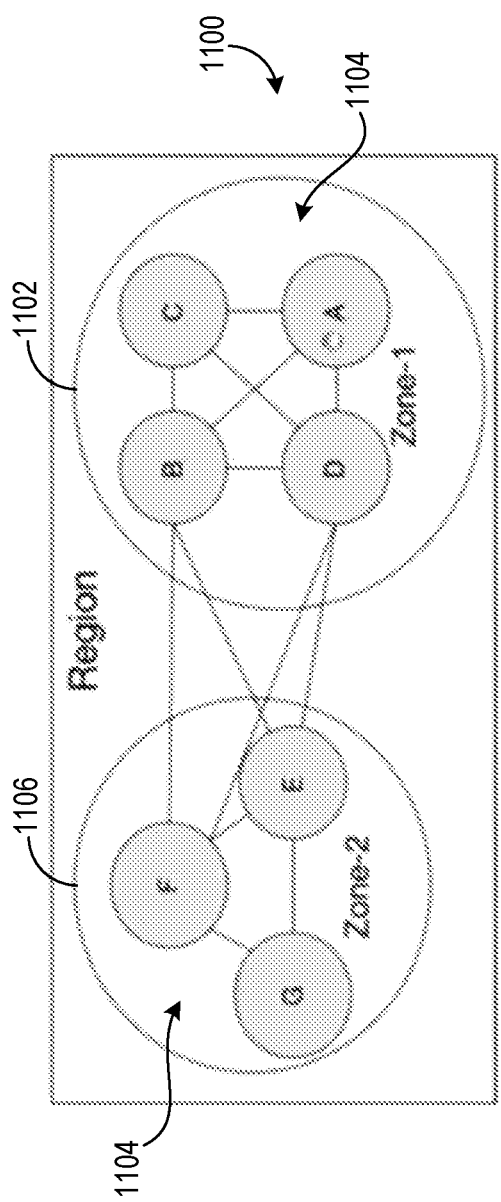
FIG. 11 illustrates an example multi-cell deployment scenario in a cloud computing system.

FIG. 11 illustrates a multi-cell deployment scenario in which broker cells are located in different zones of a cloud computing system 1100. In this example, a first zone 1102 provides four broker cells 1104A-D that are fully connected to one another, and a second zone 1106 provides three broker cells 1104E-G that are fully connected to one another. Further, one or more broker cells 1104 in first zone 1102 are connected to one or more broker cells in second zone 1106, enabling inter-zone communication. First zone 1102 and second zone 1106 may reside in different geographical regions, in some examples. Here, the overall capacity of computing system 1100 is scalable by varying the number of broker cells in zone, in addition to varying the number of front-end brokers, back-end brokers, and networking devices in each broker cell 1104. Further, broker cells 1104 may be implemented an any suitable manner, such as via virtual machines (e.g., selected in according to zone size).

In another example deployment scenario, broker cells may be implemented in an IoT environment such as an IIoT. In such an example, publishers may include image sensors that output image data, and subscribers may include one or more computing devices that implement computer vision based on image data received from the publishers. Further, broker cells may be implemented at an edge computing network, on-premises (e.g., at the site of data collection), or in any other suitable physical and/or logical location.

Broker cells described herein may be implemented in any suitable manner. As described above, the back-end and front-end brokers of a broker cell may be implemented by one or more computing devices or virtual machines. In some examples, the back-end and front-end brokers may be implemented at a common computing node. In other examples, the back-end and front-end brokers may be implemented at different computing nodes. Further, in some examples, the back-end and front-end brokers may be executed from a single binary. In such examples, back-end brokers may run as worker threads, with communication occurring through a non-blocking channel. In some examples, broker cells described herein may each be implemented as single, stand-alone units. Moreover, a broker cell may be considered a single capacity, failure, and management domain, with customers and operators viewing a broker cell as a single unit of deployment.

The examples described herein may have the properties of (1) simple request/response messaging, (2) message passing capabilities where the tail back-end broker can aggregate multiple acks to the predecessor nodes. (3) implementation of message delivery retry for writes and reads from the head and tail nodes, where the retry mechanism is to countermeasure network omission failures, (4) all nodes being servlets, where each node is both a client and a server for the internal protocol, and (5) protocol message sizes sufficient to encapsulate MQTT messages (e.g., up to 256 MB) in addition to the internal protocol headers and metadata.

Various approaches may be used to implement such an internal protocol. One approach may use a web framework where all messages are HTTP messages that follow a create, read, update, delete (CRUD) API structure. Here, the advantage may include the ability to use existing frameworks to implement the APIs. A protocol design may translate the writes, reads, and acks into CRUD APIs. Another approach uses a remote procedure call (RPC) framework, where there are options such as GRPC (available from The Linux Foundation of San Francisco, Calif.), JsonRPC, and tarpc. Using an RPC framework provides flexibility of the API definition and the development focus on the protocol functions. Another approach includes extending MQTT messages with non-standard messages. This approach follows involves developing a new message codec of the internal protocol. The new codec may define, write, read, and ack messages, as discussed herein. Another approach is to define an internal message that corresponds to each MQTT message; for example, define INTPUBLISH for PUBLISH and INTSUB SCRIBE for SUBSCRIBE. With this, each message prefixed with INT encapsulates a standard MQTT message in addition to metadata specific to the internal protocol. The metadata defines protocol semantics such as: writes, read, or acks. Further, the implementation of the internal protocol may involve augment an MQTT broker with the internal protocol servlet and reusing the MQTT broker as the front-end broker, and implement the behavior of back-end broker described herein.

The disclosed broker architecture may comprise features that provide for security. A front-end broker may be running a servlet that exposes message interfaces for the back-ends and messaging interfaces for health checks and discovery. This may form control traffic for the MQTT broker separate from regular MQTT traffic. At the same time, clients may connect to front-end brokers for regular MQTT broker traffic. Thus, in addition to an MQTT policy engine, authorization and encryption mechanisms for who is authorized to send control messages to the broker may be implemented. For example, a client connecting to the broker and sending unauthorized publish_to_cell messages may pose risk of a denial-of-service attack. To address this possibility, policy engine functionality may be extended to enforce control traffic policies, identity certificates may be used to authorize backend-to-frontend and cell-to-cell communication, and/or any a suitable authentication protocol may be used.

The example approaches described herein provide a (e.g., distributed) MQTT broker facilitating to customers the development of fault-tolerant MQTT-based applications with a global, lightweight, and unified approach independent of application deployment scenarios. The disclosed approaches may protect IoT devices/sensors messages and client sessions despite various system component failures. The disclosed brokers are provided in a cellular structure where multiple broker cells—each potentially representing a distributed broker—may be arbitrarily interconnected to form a global, reliable, and scalable IoT messaging system. Such a system may be suitable for IoT applications and deployments at the network edge in a constrained embedded environment of limited storage, memory, and compute, but may be deployed for general-purpose computing, and in edge, on-premise, and cloud contexts.

The disclosed methods further provide a message-passing protocol for broker internal state management, which may achieve reliable messaging and failure-protection for in-memory sessions and broker state. The described example replication protocol is embedded in the disclosed protocol message flow between clients and brokers, and may be transparent to client devices. The disclosed techniques may collectively minimize the replication overhead and maximize broker efficiency without relying on third-party distributed storage or local storage. The disclosed methods also facilitate routing of messages among multiple cells where cells are interconnected in an arbitrary topology. Further, the disclosed methods allow multiple cells to discover each other, where a cell may joins or leaves a computing system without affecting the operation of the system or the reliability of message delivery. Where broker failure occurs, no operator intervention is required for a broker cell to compensate. In some examples, automatic failure recovery can be employed.

Additionally, the disclosed approaches may allow dynamic scaling of brokers to accommodate various traffic patterns while maintaining a predictable performance for message throughput and latency. To that end, customers may develop IoT modules without concern of message loss, failure-recovery, or connectivity to the cloud. Additionally, the disclosed approaches provide extensibility points for distributed MQTT policies, elastic expansion, multi-protocol support, and various deployment strategies.

In some embodiments, the methods and processes described herein may be tied to a computing system of one or more computing devices. In particular, such methods and processes may be implemented as a computer-application program or service, an application-programming interface (API), a library, and/or other computer-program product.

Figure 12:
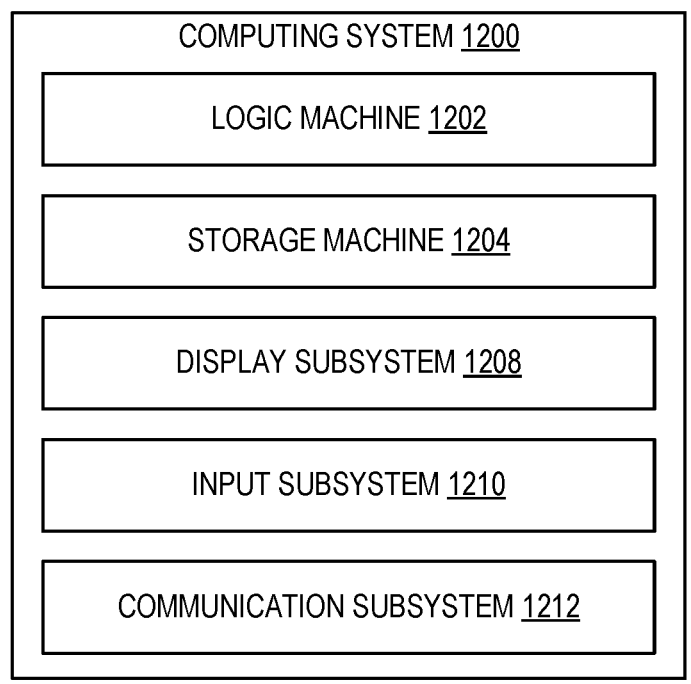
FIG. 12 shows a block diagram of an example computing system.

FIG. 12 schematically shows a non-limiting embodiment of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), and/or other computing devices. As an example, one or more of the broker cells described herein (e.g., broker cell 102A) may implement aspects of computing system 1200.

Computing system 1200 includes a logic machine 1202 and a storage machine 1204. Computing system 1200 may optionally include a display subsystem 1208, input subsystem 1210, communication subsystem 1212, and/or other components not shown in FIG. 12.

Logic machine 1202 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1204 includes one or more physical devices configured to hold instructions executable by the logic machine to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 implemented to perform a particular function. In some cases, a module, program, or engine may be instantiated via logic machine 1202 executing instructions held by storage machine 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1208 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1208 may likewise be transformed to visually represent changes in the underlying data. Display subsystem 1208 may include one or more display devices utilizing virtually any type of technology. Such display devices may be combined with logic machine 1202 and/or storage machine 1204 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1212 may be configured to communicatively couple computing system 1200 with one or more other computing devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the Internet.

Another example provides a computing system configured to implement a message queuing telemetry transport (MQTT) broker cell, the computing device comprising a logic subsystem comprising one or more processors, and a storage subsystem comprising one or more storage devices including instructions executable by the logic subsystem to operate two or more back-end brokers arranged in an m×k matrix in the broker cell, the matrix comprising m vertical chains of back-end brokers and k back-end brokers in each vertical chain, where m and k are integers, m is greater than zero, and k is greater than one, each vertical chain comprising at least a head back-end broker and a tail back-end broker, each vertical chain configured to replicate a state update received at the head back-end broker through the vertical chain to the tail back-end broker, each tail broker configured to determine one or more subscribers to a topic, operate n front-end brokers in the broker cell, each front-end broker configured to output a control message to a selected vertical chain of the m vertical chains and to output an application message for publication to subscribers and to one or more other MQTT broker cells, where n is an integer greater than zero, and operate r networking devices configured to communicate application messages to subscribers and control messages to one or more other MQTT broker cells, where r is an integer greater than one. In some such examples, each back-end broker is further configured to store one or more of a topic table comprising information regarding one or more topics being published, a session table comprising information regarding respective sessions established by one or more clients and one or more topics to which the one or more clients subscribe, or a topic filter table comprising information regarding one or more topic filters associated with one or more front-end brokers having one or more clients subscribing to the one or more topic filters. In some such examples, each back-end broker alternatively or additionally is configured to store a topic routing table comprising information regarding one or more topic filters associated with an adjacent MQTT broker cell. In some such examples, each front-end broker is further configured to select the selected vertical chain to which to output the control message based at least on consistent hashing determined based on one or more of a topic filter or a client identifier. In some such examples, the matrix further comprises a horizontal chain of back-end brokers formed by m tail back-end brokers, wherein the horizontal chain is configured to replicate a state update regarding a wildcard topic filter and not to replicate a state update regarding a non-wildcard topic filter. In some such examples, the n front-end brokers alternatively or additionally advertise a common network address to the r networking devices. In some such examples, each tail back-end broker is further configured to identify the one or more subscribers to the topic to a corresponding front-end broker. In some such examples, the computing system alternatively or additionally comprises instructions executable to, in response to detecting a failure of a first back-end broker, reconfigure a second back-end broker to operate as the first back-end broker. In some such examples, the MQTT broker cell is configured to discover the one or more other MQTT broker cells via a gossip-based communication protocol. In some such examples, the computing system alternatively or additionally comprises instructions executable to receive, at a front-end broker, a request by a client to subscribe to one or more topics, output, from the front-end broker to a head back-end broker, a control message including an identifier of the client and a topic filter indicating the one or more topics, based at least on the control message, replicate a state update from the head back-end broker through a vertical chain comprising the head-back end broker and a tail back-end broker, send, from the tail back-end broker to the front-end broker, an acknowledgement indicating that the state update was replicated through the vertical chain, and send, from the front-end node for receipt by the client, an acknowledgement indicating that the client is subscribed to the one or more topics. In some such examples, the computing system alternatively or additionally comprises instructions executable to receive, at a front-end broker, a publication of an application message, output, from the front-end broker to a head back-end broker, a control message including the application message, based at least on the control message, replicate a state update from the head back-end broker through a vertical chain comprising the head back-end broker and a tail back-end broker, the state update including the application message, determine, at the tail back-end broker, one or more subscribing front-end brokers to a topic of the application message, and publish, from the one or more subscribing front-end brokers to one or more clients subscribing to the topic, the application message.

Another example provides, on a computing system configured to implement a message queuing telemetry transport (MQTT) broker cell, a method, comprising operating two or more back-end brokers arranged in an m×k matrix in the broker cell, the matrix comprising m vertical chains of back-end brokers and k back-end brokers in each vertical chain, where m and k are integers, m is greater than zero, and k is greater than one, each vertical chain comprising at least a head back-end broker and a tail back-end broker, each vertical chain configured to replicate a state update received at the head back-end broker through the vertical chain to the tail back-end broker, each tail broker configured to determine one or more subscribers to a topic, operating n front-end brokers in the broker cell, each front-end broker configured to output a control message to a selected vertical chain of the m vertical chains and to output an application message for publication to subscribers and to one or more other MQTT broker cells, where n is an integer greater than zero, and operating r networking devices configured to communicate application messages to subscribers and control messages to one or more other MQTT broker cells, where r is an integer greater than one. In some such examples, the method further comprises storing, at each back-end broker, a topic routing table comprising information regarding one or more topic filters associated with an adjacent MQTT broker cell. In some such examples, the matrix further comprises a horizontal chain of back-end brokers formed by m tail back-end brokers, and the method alternatively or additionally comprises, at the horizontal chain, replicating a state update regarding a wildcard topic filter and not replicating a state update regarding a non-wildcard topic filter. In some such examples, the method alternatively or additionally comprises receiving, at a front-end broker, a request by a client to subscribe to one or more topics, outputting, from the front-end broker to a head back-end broker, a control message including an identifier of the client and a topic filter indicating the one or more topics, based at least on the control message, replicating a state update from the head back-end broker through a vertical chain comprising the head-back end broker and a tail back-end broker, sending, from the tail back-end broker to the front-end broker, an acknowledgement indicating that the state update was replicated through the vertical chain, and sending, from the front-end node for receipt by the client, an acknowledgement indicating that the client is subscribed to the one or more topics. In some such examples, the method alternatively or additionally comprises receiving, at a front-end broker, a publication of an application message, outputting, from the front-end broker to a head back-end broker, a control message including the application message, based at least on the control message, replicating a state update from the head back-end broker through a vertical chain comprising the head back-end broker and a tail back-end broker, the state update including the application message, determining, at the tail back-end broker, one or more subscribing front-end brokers to a topic of the application message, and publishing, from the one or more subscribing front-end brokers to one or more clients subscribing to the topic, the application message.

Another example provides a computing system configured to implement a plurality of message queuing telemetry transport (MQTT) broker cells, each broker cell comprising one or more computing devices, each computing device comprising a logic subsystem including one or more processors, and a storage subsystem comprising one or more storage devices including instructions executable by the logic subsystem to, at a first broker cell operate two or more back-end brokers arranged in an m×k matrix in the broker cell, the matrix comprising m vertical chains of back-end brokers and k back-end brokers in each vertical chain, where m and k are integers, m is greater than zero, and k is greater than one, each vertical chain comprising at least a head back-end broker and a tail back-end broker, each vertical chain configured to replicate a state update received at the head back-end broker through the vertical chain to the tail back-end broker, each tail broker configured to determine one or more subscribers to a topic, operate n front-end brokers in the broker cell, each front-end broker configured to output a control message to a selected vertical chain of the m vertical chains and to output an application message for publication to subscribers and to one or more other MQTT broker cells, where n is an integer greater than zero, operate r networking devices configured to communicate application messages to subscribers and control messages to one or more other MQTT broker cells, where r is an integer greater than one, receive, at a selected front-end broker, an application message published to the selected front-end broker by a client publishing to the selected front-end broker, and publish, from the selected front-end broker to a front-end broker of a second broker cell, the application message for receipt by a client subscribing to the second broker cell. In some such examples, the first broker cell is provided in a first logical layer of the computing system, and the second broker cell is provided in a second logical layer of the computing system separated from the first logical layer by a firewall. In some such examples, a client of a first broker cell comprising the selected front-end broker comprises a sensor device implemented in an internet-of-things. In some such examples, the first broker cell alternatively or additionally is located in a first zone of a cloud computing system, and the second broker cell alternatively or additionally is located in a second zone of the cloud computing system different from the first zone.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system configured to implement a message queuing telemetry transport (MQTT) broker cell, the computing system comprising:
    a logic subsystem comprising a processor; and
    a storage subsystem comprising memory storing instructions executable by the logic subsystem to:
        operate a vertical chain of back-end brokers in the MQTT broker cell, the vertical chain of back-end brokers being configured to maintain a data structure associating topics with application messages published by publishing clients and further associating the topics with subscribing clients subscribed to the topics; and
        operate a front-end broker to support communications to and from the publishing clients and the subscribing clients, the front-end broker configured to receive an application message from a client device and based on the application message, convey a state update regarding a client subscription or message publication to the vertical chain of back-end brokers, each broker in the vertical chain of back-end brokers being configured to replicate the state update sequentially.

2. The computing system of claim 1, wherein the instructions are further executable to:
    operate a networking device to communicate application messages generated by the front-end broker to the publishing clients and the subscribing clients.

3. The computing system of claim 2, wherein the front-end broker is further configured to output a control message including the state update to other MQTT cells via the networking device.

4. The computing system of claim 1, wherein the vertical chain of back-end brokers includes a head back-end broker configured to:
    detect a failure of a middle back-end broker in the vertical chain;
    identify a next back-end broker in the chain following the middle back-end broker;
    alter a configuration to remove the middle back-end broker from the vertical chain; and
    replicate the state update to the next back-end broker in the vertical chain.

5. The computing system of claim 1, wherein incoming application message includes at least one of a request for a subscription or publication.

6. The computing system of claim 1, wherein the state update relates to at least one of a client subscription or a message publication.

7. The computing system of claim 1, wherein the vertical chain of back-end brokers is one of multiple vertical chains arranged in a matrix within the MQTT broker cell and wherein the MQTT broker cell further comprises multiple front-end brokers, each of the multiple front-end brokers being configured to transmit a control message including a state update to a selected vertical chain of the multiple vertical chains in response to receiving an application message from a client.

8. The computing system of claim 1, further comprising instructions executable by the logic subsystem to:
    receive, at the front-end broker, a request by a client to subscribe to a topic;
    output, from the front-end broker to a head back-end broker of the vertical chain, a control message including an identifier of the client and a topic filter indicating the topic;
    based at least in part on the control message, replicate a state update from the head back-end broker through the vertical chain to a tail back-end broker;
    send, from the tail back-end broker to the front-end broker, an acknowledgement indicating that the state update was replicated through the vertical chain; and
    send, from the front-end broker for receipt by the client, an application message acknowledging that the client is subscribed to the topic.

9. The computing system of claim 1, further comprising instructions executable by the logic subsystem to:
    receive, at the front-end broker, a publication of an application message;
    output, from the front-end broker to a head back-end broker of the vertical chain, a control message including the application message;
    based at least in part on the control message, replicate a state update from the head back-end broker through the vertical chain to a tail back-end broker, the state update including the application message;
    determine, at the tail back-end broker, a subscribing front-end broker of another MQTT cell to a topic of the application message; and
    publish, from the subscribing front-end broker of the another MQTT cell to one or more clients subscribing to the topic, the application message.

10. A method for operating a message queuing telemetry transport (MQTT) broker cell, the method comprising:
    maintaining, by a head back-end broker in a vertical chain of back-end brokers in the MQTT broker cell, a first data structure associating topics with application messages published by publishing clients;
    maintaining, by a tail back-end broker in the vertical chain of back-end brokers in the MQTT broker cell, a second data structure associating the topics with application messages published by publishing clients;
    configuring a front-end broker in the MQTT broker cell to:
        receive an incoming application message from a client; and in response to receipt of the incoming application message, transmit a control message to the head back-end broker in the vertical chain of back-end brokers; and generate an outgoing application message for transmission to the client in response to receiving a confirmation from the tail back-end broker, wherein the control message indicates a state update regarding a client subscription or message publication and each broker in the vertical chain is configured to replicate the state update at each broker in the vertical chain.

11. The method of claim 10, further comprising:
communicating, from a networking device, the outgoing application message generated by the front-end broker to the client.

12. The method of claim 10, wherein the application message includes at least one of a request for a subscription or publication.

13. The method of claim 10, wherein the vertical chain of back-end brokers is one or multiple vertical chains arranged in a matrix within the MQTT broker cell and wherein the MQTT broker cell further comprises multiple front end brokers.

14. The method of claim 10, wherein the vertical chain of back-end brokers further includes a middle back-end broker and wherein the method further comprises:
  detecting, by the head back-end broker, a failure of the middle back-end broker;
  identifying, by the head back-end broker, a next back-end broker in the vertical chain following the middle back-end broker; and
  replicating, by the head back-end broker, the state update to the next back-end broker in the vertical chain.

15. A computer system comprising:
a processing system;
memory;
computer-executable instructions stored in the memory and executable by the processing system to operate a broker cell, the broker cell including:
  multiple vertical chains of back-end brokers, each of the multiple vertical chains storing data structures associating topics with subscribing clients and topics with messages published by publishing clients;
  multiple front-end brokers configured to support incoming and outgoing communications with clients, each of the front-end brokers being configured to convey a state update regarding a client subscription or message publication to a corresponding chain of the multiple vertical chains, the state update being replicated sequentially at each broker in the corresponding chain; and
  multiple networking devices in the broker cell configured to facilitate communications between the clients and the multiple front-end brokers.

16. The computer system of claim 15, wherein each of the multiple front-end brokers and each of the back-end brokers in the broker cell are implemented on a different computing device.

17. The computer system of claim 15, wherein each of the multiple front-end brokers is configured to convey the state update in response to receiving an incoming application message from one of the clients.

18. The computer system of claim 17, wherein the incoming application message includes at least one of a publication request and a subscription request.

* * * * *